US012703416B2

(12) United States Patent
Yuan

(10) Patent No.: US 12,703,416 B2
(45) Date of Patent: Aug. 11, 2026

(54) CHILD CARRYING MECHANISM AND RELATED CHILD CARRIER

(71) Applicant: Wonderland Switzerland AG, Steinhausen (CH)

(72) Inventor: Jialiang Yuan, Guanngdong (CN)

(73) Assignee: Wonderland Switzerland AG, Steinhausen (CH)

( * ) Notice: Subject to any disclaimer, the term of this patent is extended or adjusted under 35 U.S.C. 154(b) by 550 days.

(21) Appl. No.: 18/029,769

(22) PCT Filed: Oct. 8, 2021

(86) PCT No.: PCT/EP2021/077859
§ 371 (c)(1),
(2) Date: Mar. 31, 2023

(87) PCT Pub. No.: WO2022/074192
PCT Pub. Date: Apr. 14, 2022

(65) Prior Publication Data
US 2023/0365180 A1 Nov. 16, 2023

(30) Foreign Application Priority Data
Oct. 9, 2020 (CN) ......................... 202011070349.4

(51) Int. Cl.
*B62B 7/14* (2006.01)
*A47D 9/00* (2006.01)
(Continued)

(52) U.S. Cl.
CPC .............. *B62B 7/142* (2013.01); *A47D 9/005* (2013.01); *A47D 9/016* (2022.08); *A47D 13/027* (2022.08);
(Continued)

(58) Field of Classification Search
CPC ...... A47D 9/005; A47D 13/02; A47D 13/027; B62B 9/102; B62B 9/104; B62B 7/123
See application file for complete search history.

(56) References Cited

U.S. PATENT DOCUMENTS 2,636,190 A * 4/1953 Avila .................... A47D 9/005 4/547
6,526,608 B1 * 3/2003 Hsia ...................... A47D 9/016 5/98.1
(Continued)

FOREIGN PATENT DOCUMENTS

CN 102616266 A * 8/2012
CN 202908316 U 5/2013
(Continued)

OTHER PUBLICATIONS

Office Action issued in corresponding Taiwanese Application No. 11213438 dated Mar. 6, 2024. English Translation Included.
(Continued)

*Primary Examiner* — Emma K Frick
(74) *Attorney, Agent, or Firm* — Volpe Koenig

(57) ABSTRACT

A child carrying mechanism (10) is provided and includes a carrying frame (11), a surrounding frame (12) and a supporting component (13). The surrounding frame (12) is disposed above the carrying frame (11) and located at a position corresponding to the carrying frame (11). The surrounding frame (12) is switchable between an unfolded state and a folded state. The supporting component (13) is connected between the surrounding frame (12) and the carrying frame (11). Besides, a child carrier (100) having the aforementioned child carrying mechanism (10) is provided.

28 Claims, 26 Drawing Sheets

(51) Int. Cl.
*A47D 13/02* (2006.01)
*B62B 7/06* (2006.01)

(52) U.S. Cl.
CPC .............. *B62B 7/062* (2013.01); *B62B 7/064* (2013.01); *B62B 2205/20* (2013.01)

(56) References Cited

U.S. PATENT DOCUMENTS

| | | | | |
|---|---|---|---|---|
| 6,701,547 | B2 * | 3/2004 | Hsia | A47D 13/063 5/98.1 |
| 8,651,502 | B2 * | 2/2014 | Winterhalter | B62B 7/006 280/643 |
| 9,066,610 | B2 * | 6/2015 | Duan | A47D 9/012 |
| 9,138,070 | B1 * | 9/2015 | Shamie | A47D 7/002 |
| 9,221,487 | B2 * | 12/2015 | Doucette | B62B 7/123 |
| 11,370,469 | B2 | 6/2022 | Huang et al. | |
| 11,647,846 | B2 * | 5/2023 | Tuckey | A47D 7/04 5/99.1 |
| 11,939,111 | B2 * | 3/2024 | Mu | A01K 13/001 |
| 12,351,230 | B2 * | 7/2025 | Li | B62B 9/18 |
| 2007/0006910 | A1 * | 1/2007 | Chu | A47D 9/005 135/147 |
| 2018/0162437 | A1 | 6/2018 | Mostert | |
| 2019/0322304 | A1 | 10/2019 | Zhong | |
| 2026/0060445 | A1 * | 3/2026 | Tang | A47D 9/005 |
| 2026/0069050 | A1 * | 3/2026 | Tang | A47D 9/005 |
| 2026/0069054 | A1 * | 3/2026 | Zhang | A47D 13/027 |
| 2026/0076489 | A1 * | 3/2026 | Wang | A47D 13/027 |

FOREIGN PATENT DOCUMENTS

| | | | | | |
|---|---|---|---|---|---|
| CN | 204196991 | U | * | 3/2015 | |
| CN | 103738382 | B | | 12/2015 | |
| CN | 205131317 | U | | 4/2016 | |
| CN | 105857381 | A | * | 8/2016 | B62B 7/147 |
| CN | 105996587 | A | * | 10/2016 | A47D 13/02 |
| CN | 205652181 | U | | 10/2016 | |
| CN | 104494679 | B | | 3/2017 | |
| CN | 106490883 | A | * | 3/2017 | A47D 13/02 |
| CN | 107224151 | A | * | 10/2017 | A47D 13/02 |
| CN | 108137075 | A | | 6/2018 | |
| CN | 108433443 | A | * | 8/2018 | A47D 13/02 |
| CN | 207693311 | U | * | 8/2018 | A47D 9/005 |
| CN | 109077533 | A | | 12/2018 | |
| CN | 110182251 | A | | 8/2019 | |
| CN | 110448099 | A | | 11/2019 | |
| CN | 110466587 | A | | 11/2019 | |
| CN | 110710828 | A | | 1/2020 | |
| CN | 110811219 | A | * | 2/2020 | A47D 13/02 |
| CN | 210822429 | U | | 6/2020 | |
| DE | 202007004742 | U1 | * | 5/2007 | B62B 7/142 |
| EP | 1493361 | A1 | * | 1/2005 | A47D 9/005 |
| EP | 2946985 | A1 | | 11/2015 | |
| FR | 1322247 | A | * | 3/1963 | A47D 9/005 |
| TW | 384819 | U | | 3/2000 | |
| TW | 201711890 | A | | 4/2017 | |
| WO | WO-2008028597 | A1 | * | 3/2008 | A47D 9/016 |
| WO | WO-2014071987 | A1 | * | 5/2014 | A47D 13/02 |
| WO | 2014110963 | A1 | | 7/2014 | |
| WO | 2019233430 | A1 | | 12/2019 | |

OTHER PUBLICATIONS

"First Office Action Issued in Corresponding Taiwanese Patent Application No. 113139648" along with partial English translation, Mailed Date: Mar. 11, 2025, 6 pages.

"Search Report Issued in Corresponding Chinese Patent Application No. 202011070349.4", Mailed Date: Jul. 30, 2021, 16 pages.

"First Office Action Issued in Corresponding Chinese Patent Application No. 202011070349.4", Mailed Date: Mar. 26, 2024, 11 pages.

International Search Report and Written Opinion for PCT/EP2021/077859 dated Dec. 22, 2021.

Taiwan Intellectual Property Office. Office Action for corresponding application TW 114139740, mailed May 5, 2026. 8 pages. Partial English translation provided.

* cited by examiner

10

1214

CHILD CARRYING MECHANISM AND RELATED CHILD CARRIER

CROSS REFERENCE TO RELATED APPLICATIONS

This is a 371 U.S. National Phase of International Application No. PCT/EP2021/077859, filed on Oct. 8, 2021, which claims the benefit of Chinese Patent Application No. 202011070349.4, filed on Oct. 9, 2020, the contents of which are incorporated herein by reference in their entirety.

FIELD OF THE INVENTION

The present application relates to a child carrying mechanism and a related child carrier according to the pre-characterizing clauses of claims 1 and 25.

BACKGROUND OF THE INVENTION

Child carriers, such as child strollers or child carrycots, have been widely used in families with children. With diversified development of the child carriers, while requirement for the functionality of the child carriers is getting higher and higher, safety and practicability of the child carriers are always constant pursuits and also are important design indicators. People hope not only that safety of children riding in the child carriers can be guaranteed, but also that the operation and use of the child carriers can be simple and easy. However, structure of the conventional child carriers is complicated and cannot be folded, which is not convenient to daily use and carrying.

SUMMARY OF THE INVENTION

This is mind, the present application aims at providing a child carrying mechanism with simple structure and easy folding operation and a related child carrier.

This is achieved by a child carrying mechanism and a related child carrier according to claims 1 and 25. The dependent claims pertain to corresponding further developments and improvements.

As will be seen more clearly from the detail description following below, the claimed child carrying mechanism includes a carrying frame, a surrounding frame and a supporting component. The surrounding frame is disposed above the carrying frame and located at a position corresponding to the carrying frame. The surrounding frame is switchable between an unfolded state and a folded state. The supporting component is connected between the surrounding frame and the carrying frame.

According to an embodiment of the present application, a lower end of the supporting component is detachably installed on the carrying frame.

According to an embodiment of the present application, an upper end of the supporting component is pivotable relative to the surrounding frame.

According to an embodiment of the present application, the child carrying mechanism further includes a first locking component. The first locking component is movably disposed on the surrounding frame and for locking the surrounding frame in the unfolded state. The supporting component drives the first locking component to unlock the surrounding frame for allowing the surrounding frame to switch from the unfolded state to the folded state when the supporting component is pivoted relative to the surrounding frame.

According to an embodiment of the present application, a first locked portion is formed on the surrounding frame and for cooperating with the first locking component. The supporting component and the first locking component are movably linked with each other. The first locking component is switchable relative to the surrounding frame between a first locking position and a first unlocking position. The first locking component engages with the first locked portion when the first locking component is located at the first locking position. The first locking component disengages from the first locked portion when the first locking component is located at the first unlocking position, and the supporting component drives the first locking component to move from the first locking position to the first unlocking position when the supporting component is pivotally folded relative to the surrounding frame.

According to an embodiment of the present application, the first locking component is slidably disposed on the surrounding frame.

According to an embodiment of the present application, the upper end of the supporting component is pivotally disposed on the surrounding frame.

According to an embodiment of the present application, the child carrying mechanism further includes a sliding component slidably disposed on the surrounding frame and movably linked to the upper end of the supporting component and the first locking component, and the supporting component drives the sliding component to drive the first locking component to move from the first locking position to the first unlocking position when the supporting component is pivotally folded relative to the surrounding frame.

According to an embodiment of the present application, the child carrying mechanism further includes a linking component disposed between the sliding component and the first locking component, and a first end and a second end of the linking component are connected to the sliding component and the first locking component respectively.

According to an embodiment of the present application, at least one of the first locking component and the linking component is disposed in the surrounding frame.

According to an embodiment of the present application, a driven portion is formed on the sliding component and inclined relative to a sliding direction of the sliding component. A driving portion is formed on the upper end of the supporting component and for cooperating with the driven portion, and the supporting component pivots relative to the surrounding frame to drive the sliding component to slide toward or away from the upper end of the supporting component by a cooperation of the driving portion and the driven portion.

According to an embodiment of the present application, the child carrying mechanism further includes a mounting component and a mounted portion. The mounting component is slidably disposed on one of the lower end of the supporting component and the carrying frame. The mounted portion is disposed on another one of the lower end of the supporting component and the carrying frame. The supporting component is installed on the carrying frame by a cooperation of the mounting component and the mounted portion.

According to an embodiment of the present application, the child carrying mechanism further includes an operating component disposed on the mounting component.

According to an embodiment of the present application, the child carrying mechanism further includes a connecting base. The carrying frame includes a first carrying component and a second carrying component installed on the first carrying component. The first carrying component and the second carrying component are pivotable relative to each other. The surrounding frame is installed on the first carrying component or the second carrying component by the connecting base. One of the mounted portion and the mounting component is disposed on an end portion of the first carrying component, and another one of the mounted portion and the mounting component is disposed on the lower end of the supporting component.

According to an embodiment of the present application, the surrounding frame includes a joint device, a handle, a first frame component and a second frame component. The handle, the first frame component and the second frame component are disposed on the joint device and pivotable relative to one another by the joint device. The joint device locks the handle when the surrounding frame is in the unfolded state, and the first frame component drives the joint device to unlock the handle for allowing the handle to pivotally fold together with the first frame component relative to the second frame component when the first frame component is pivotally folded relative to the second frame component.

According to an embodiment of the present application, the joint device includes a first joint component, a second joint component, a third joint component and a second locking component. The first joint component, the second joint component and the third joint component are pivotable relative to one another. A second locked portion is formed on one of the first joint component and the third joint component and for cooperating with the second locking component. The second locking component is movably disposed on another one of the first joint component and the third joint component. The second locking component is switchable between a second locking position and a second locking position. The second locking component engages with the second locked portion when the second locking component is located at the second locking position. The second locking component disengages from the second locked portion when the second locking component is located at the second unlocking position. The second joint component and the second locking component are movably linked to each other. The handle is connected to the third joint component. The second frame component is connected to the first joint component, and the first frame component is connected to the second joint component.

According to an embodiment of the present application, the second joint component drives the second locking component to move from the second locking position to the second unlocking position for allowing the third joint component to pivotally fold together with the second joint component relative to the first joint component when the second joint component pivotally folds relative to the first joint component.

According to an embodiment of the present application, the first joint component and the third joint component are pivotally installed on a first side and a second side of the second joint component respectively, and the first joint component, the second joint component and the third joint component are pivotable around a first pivoting axis.

According to an embodiment of the present application, the second locking component is disposed on the another one of the first joint component and the third joint component in a slidable manner along an extending direction of the first pivoting axis and passes through the second joint component.

According to an embodiment of the present application, a chamber is formed on the second joint component and arranged along the extending direction of the first pivoting axis, and the second locking component passes through the chamber.

According to an embodiment of the present application, an abutting structure is formed on one of the second joint component and the second locking component. An abutted structure is formed on another one of the second joint component and the second locking component, and the second joint component drives the second locking component to move from the second locking position to the second unlocking position by a cooperation of the abutting structure and the abutted structure when the second joint component pivotally folds relative to the first joint component.

According to an embodiment of the present application, the abutting structure is an inclined structure extending helically relative to the first pivoting axis.

According to an embodiment of the present application, the abutted structure is a protruding structure protruding outwardly from an outer periphery of the second locking component.

According to an embodiment of the present application, a guiding portion is formed on at least one of the first joint component and the second joint component and arranged along an extending direction of the first pivoting axis. A guided portion is formed on the second locking component and for cooperating with the guiding portion, and the guiding portion is sleeved in the guided portion.

Furthermore, the claimed child carrier includes a carrier body and the child carrying mechanism of any one of the aforementioned embodiments, and the child carrying mechanism is installed on the carrier body.

According to an embodiment of the present application, the carrier body is switchable between a used state and a stored state. The child carrier further includes an actuator disposed on the carrier body and for unlocking the carrier body, and the surrounding frame drives the actuator to unlock the carrier body for allowing the carrier body to switch from the used state to the stored state when the surrounding frame is switched from the unfolded state to the folded state.

According to an embodiment of the present application, the child carrier further includes a linking device. An end of the linking device is movably linked to the surrounding frame, and the surrounding frame drives the linking device to drive the actuator to unlock the carrier body for allowing the carrier body to switch from the used state to the stored state when the surrounding frame is switched from the unfolded state to the folded state.

According to an embodiment of the present application, the linking device includes a pushing component and a pushed component. The pushing component is slidable relative to the surrounding frame along a vertical direction upwardly or downwardly. The pushed component is slidable relative to the surrounding frame along a horizontal direction inwardly or outwardly. A first end of the pushed component is movably linked to a lower end of the pushing component, and a second end of the pushed component is disposed on the surrounding frame in a retractable and extendable manner.

According to an embodiment of the present application, the surrounding frame pushes the pushing component to slide downwardly when the surrounding frame is switched from the unfolded state to the folded state, and the pushing component pushes the pushed component to slide outwardly to drive the actuator to unlock the carrying frame when the pushing component slides downwardly.

According to an embodiment of the present application, a pushing structure is formed on the lower end of the pushing component and for cooperating with the pushed component, and the pushing component pushes the pushed component to slide outwardly by the pushing structure when the pushing component slides downwardly.

According to an embodiment of the present application, the pushing structure is a slanted structure.

In contrast to the prior art, in the present application, the child carrying mechanism includes the carrying frame, the surrounding frame and the supporting component. The surrounding frame is disposed above the carrying frame and located at a position corresponding to the carrying frame. The surrounding frame is switchable between an unfolded state and a folded state. The supporting component is connected between the surrounding frame and the carrying frame. The child carrying mechanism can be unfolded or folded by switching the surrounding frame to the unfolded state or the folded state. Therefore, the present application has advantages of simple structure and the easy folding operation, which is convenient for daily use, maintenance and carrying.

These and other objectives of the present application will no doubt become obvious to those of ordinary skill in the art after reading the following detailed description of the preferred embodiment that is illustrated in the various figures and drawings.

BRIEF DESCRIPTION OF THE DRAWINGS

In the following, the invention is further illustrated by way of example, taking reference to the accompanying drawings. Thereof

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "right", "left", "front", "back", etc., is used with reference to the orientation of the Figure(s) being described. The components of the present application can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is coupled to a second device, that connection may be through a direct mechanical connection, or through an indirect mechanical connection via other devices and connections.

Figure 1:
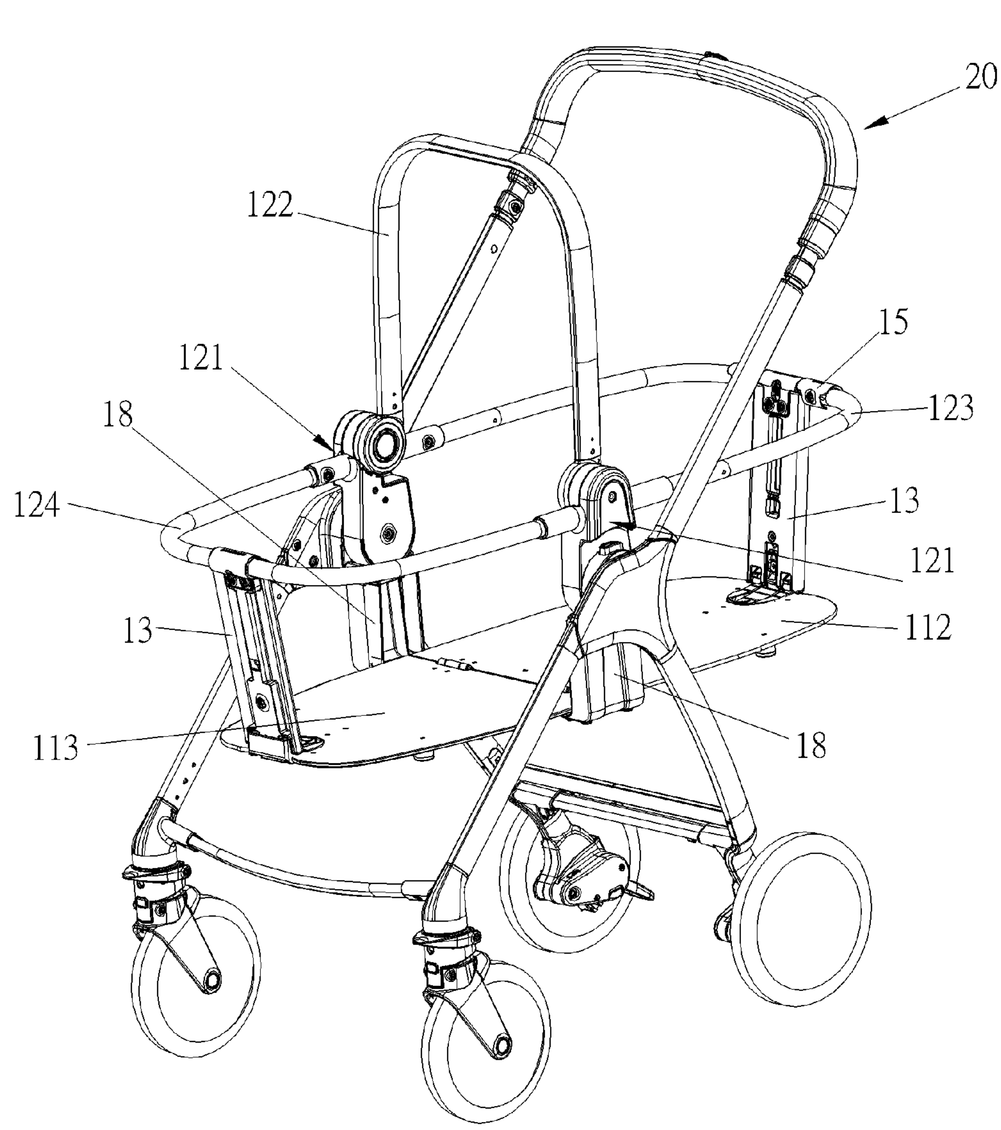
FIG. 1 is a schematic diagram of a child carrier according to an embodiment of the present application.
Figure 2:
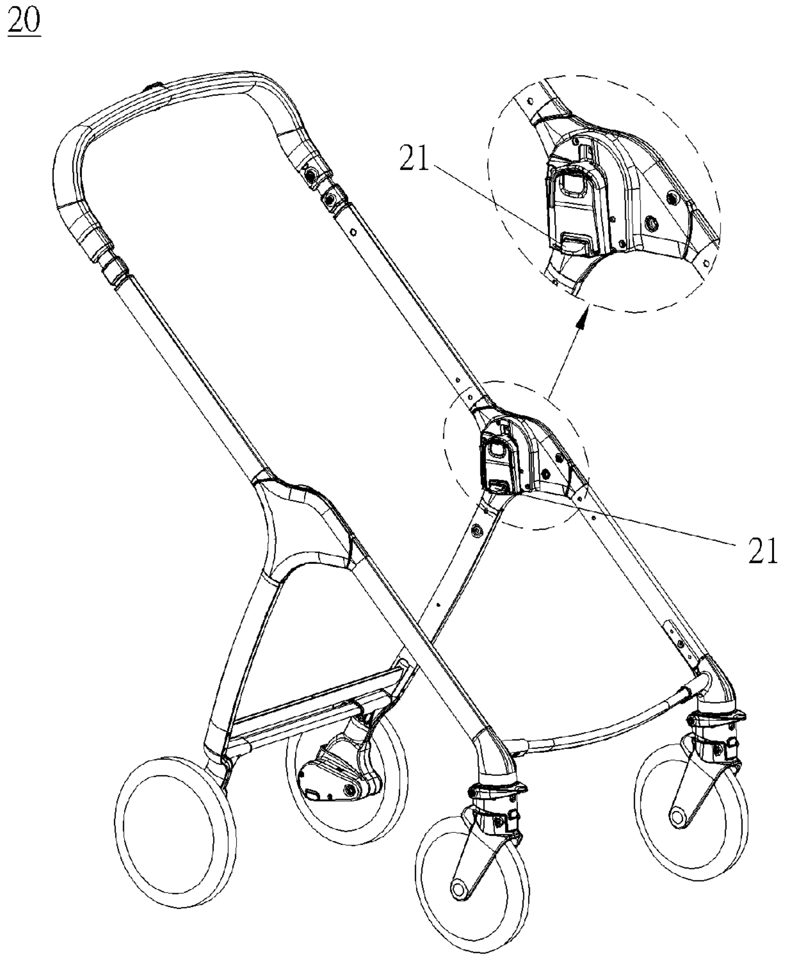
FIG. 2 is a diagram of a carrier body according to the embodiment of the present application.
Figure 3:
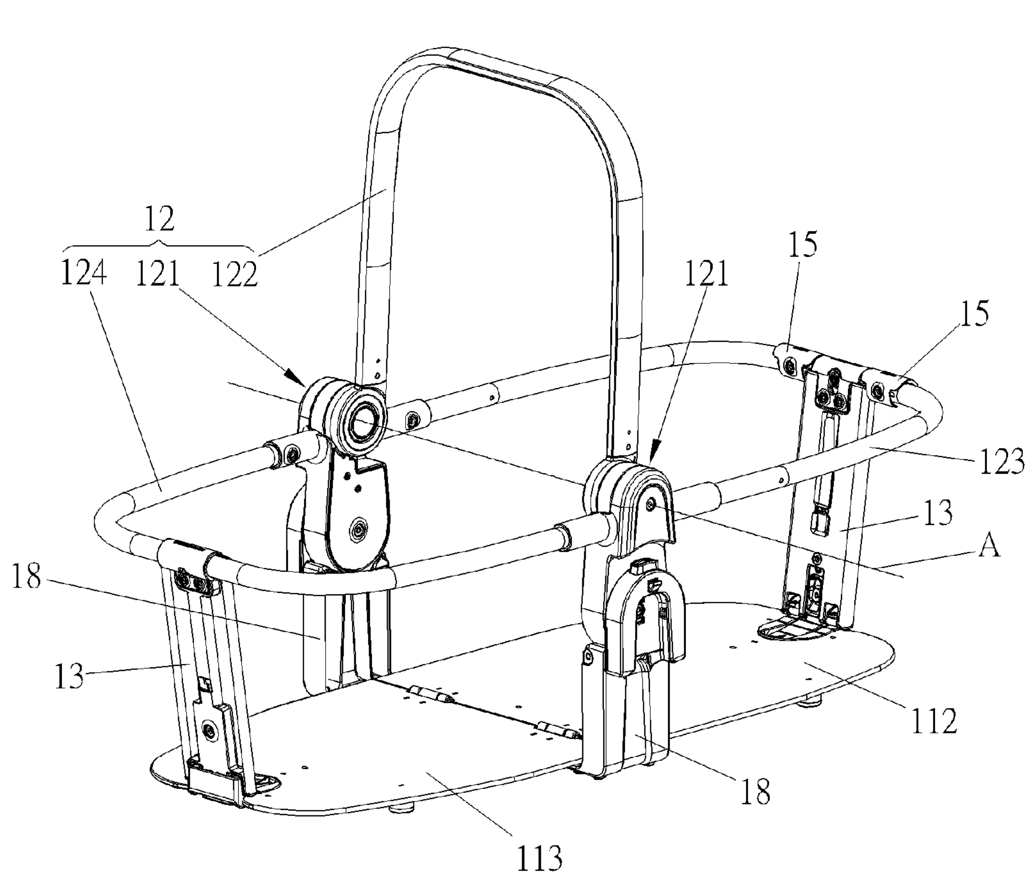
FIG. 3 and FIG. 4 are diagrams of a child carrying mechanism in different states according to the embodiment of the present application.
Figure 4:
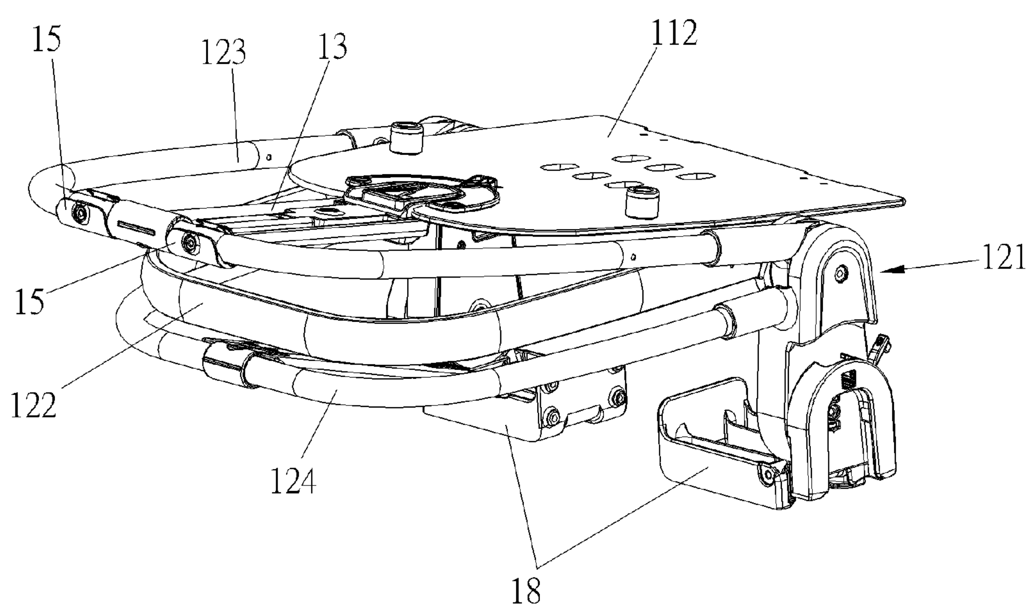

Please refer to FIG. 1 to FIG. 4. FIG. 1 is a schematic diagram of a child carrier 100 according to an embodiment of the present application. FIG. 2 is a diagram of a carrier body 20 according to the embodiment of the present application. FIG. 3 and FIG. 4 are diagrams of a child carrying mechanism 10 in different states according to the embodiment of the present application. As shown in FIG. 1 to FIG. 4, the child carrier 100 includes the child carrying mechanism 10 and the carrier body 20. The child carrying mechanism 10 is installed on the carrier body 20 and for supporting a child.

In this embodiment, the child carrying mechanism 10 can be a child carrycot, and the carrier body 20 can be a stroller frame including a handling bar, a front leg and a rear leg pivotable relative to one another. However, the present application is not limited to this embodiment. For example, in another embodiment, the child carrying mechanism can be a child basket, and the carrier body can be a basket supporting frame.

Preferably, in order for easy use and carrying, the child carrying mechanism 10 can be detachably installed on the carrier body 20. However, the present application is not limited to this embodiment. For example, in another embodiment, the child carrying mechanism can be fixedly installed on the carrier body.

Figure 5:
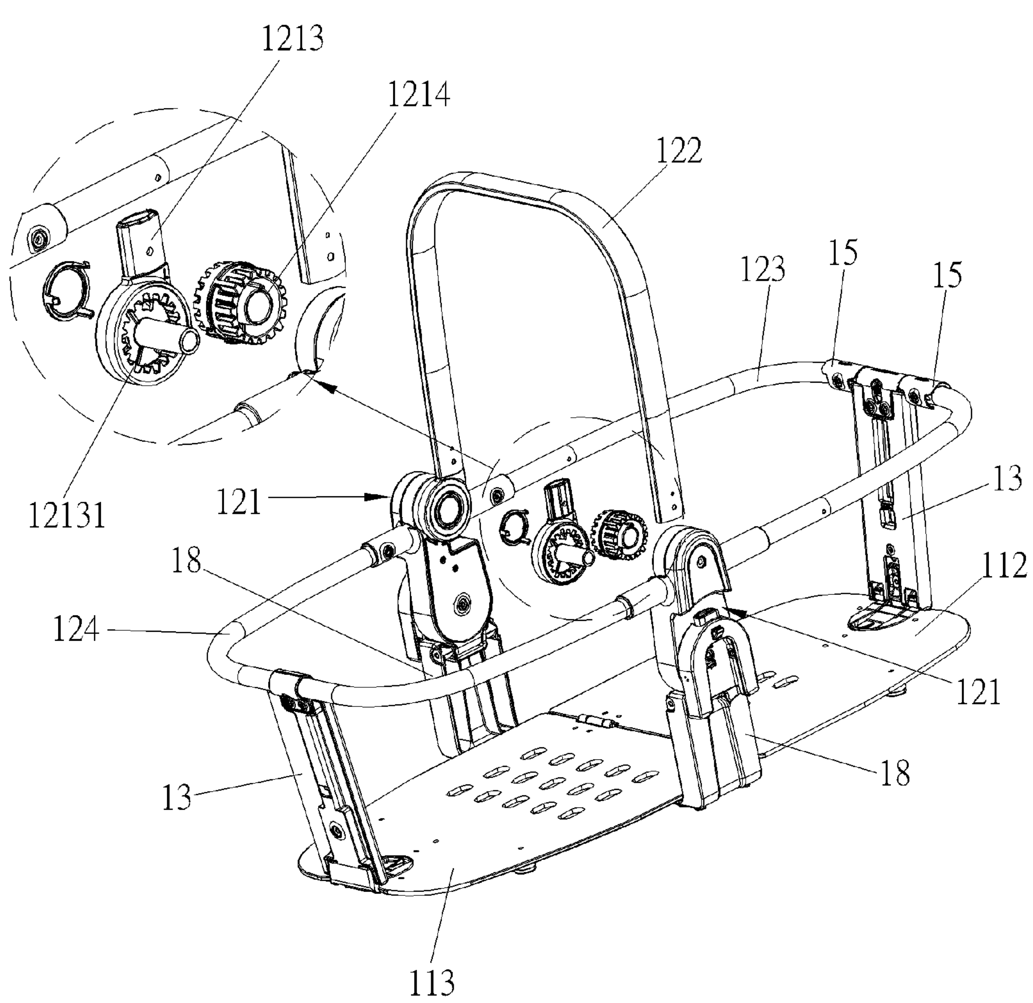
FIG. 5 to FIG. 7 are exploded diagrams of the child carrying mechanism at different views according to the embodiment of the present application.
Figure 6:
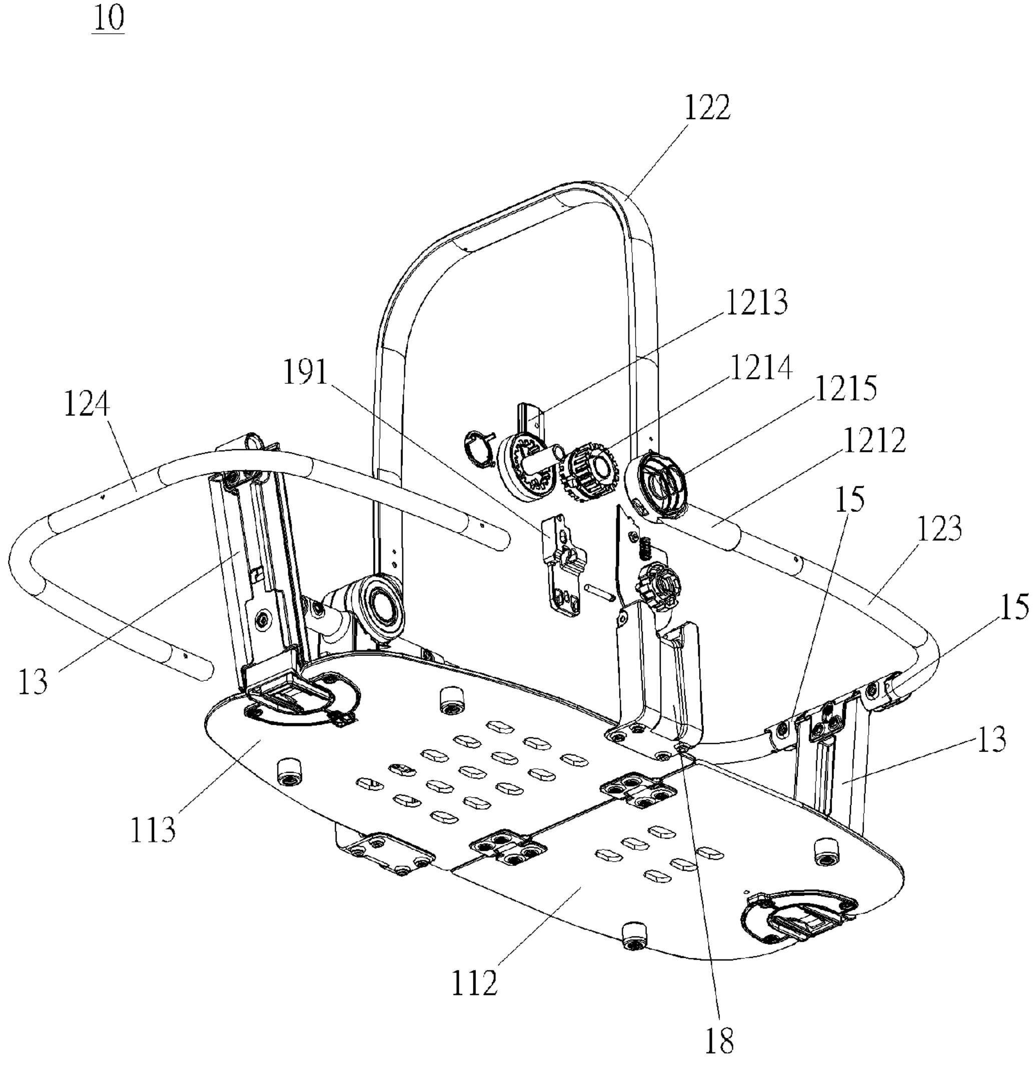
Figure 7:
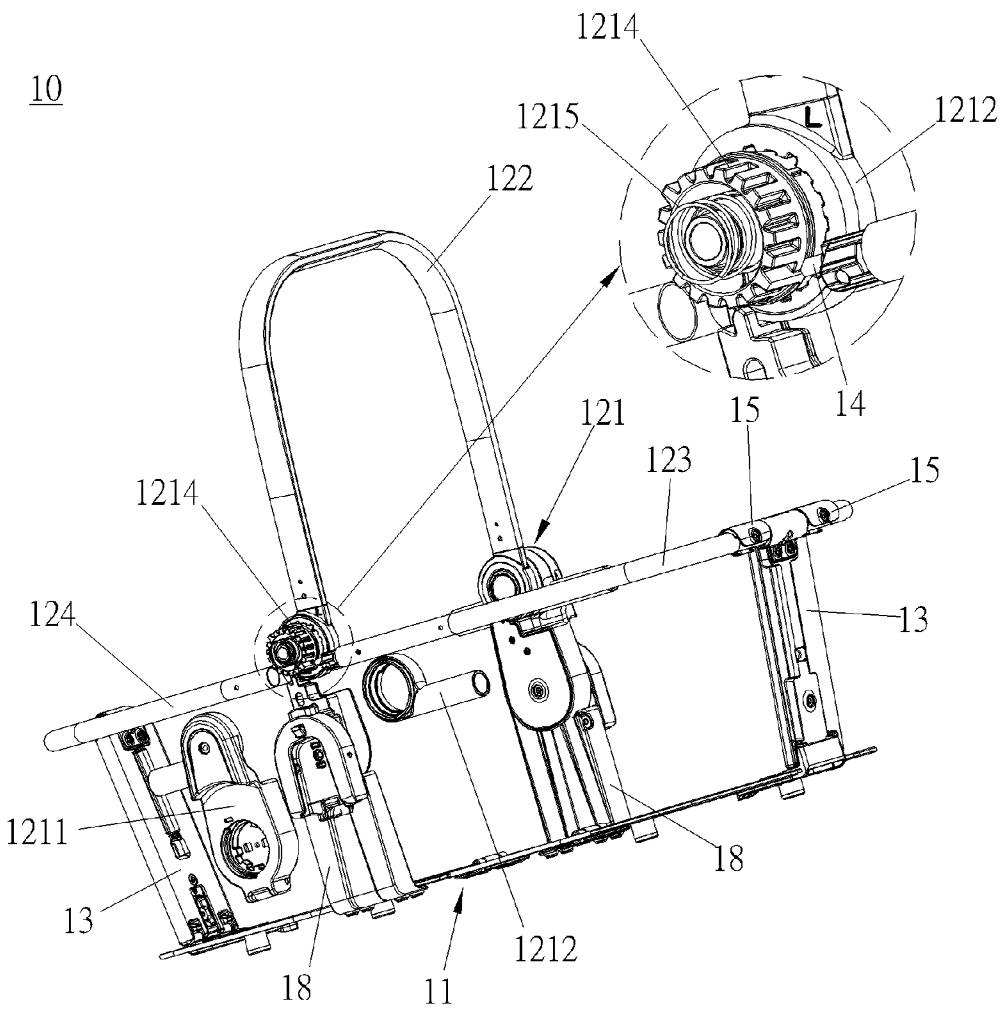

The carrier body 20 can include structure similar to a conventional foldable stroller frame. Detailed description for the carrier body 20 is omitted herein for simplicity. Illustration of the child carrying mechanism 10 is provided as follows. Please refer to FIG. 3 to FIG. 7. FIG. 5 to FIG.

7 are exploded diagrams of the child carrying mechanism 10 at different views according to the embodiment of the present application. As shown in FIG. 3 to FIG. 7, the child carrying mechanism 10 includes a carrying frame 11, a surrounding frame 12 and two supporting components 13. The surrounding frame 12 is disposed above the carrying frame 11 and located at a position corresponding to the carrying frame 11. The surrounding frame 12 is switchable between an unfolded state as shown in FIG. 3 and a folded state as shown in FIG. 4. Each of the supporting components 13 is connected between the surrounding frame 12 and the carrying frame 11. The two supporting components 13 are respectively located at a front end and a rear end of the child carrying mechanism 10 for providing better structural stability and structural support. The child carrying mechanism 10 can be unfolded or folded by switching the surrounding frame 12 to the unfolded state as shown in FIG. 3 or the folded state as shown in FIG. 4. Therefore, the present application has advantages of simple structure and the easy folding operation, which is convenient for daily use, maintenance and carrying.

Specifically, in order to allow the child carrying mechanism 10 to have more flexibility in use and to be folded more compactly, a lower end of each of the supporting components 13 is detachably installed on the carrying frame 11, i.e., each of the supporting components 13 is configured to be detachable from the carrying frame 11. An upper end of each of the supporting components 13 is pivotally disposed on the surrounding frame 12, so that the upper end of each of the supporting components 13 is pivotable relative to the surrounding frame 12. When each of the supporting components 13 is installed on the carrying frame 11, each of the supporting components 13 can provide a stable structural connection between the surrounding frame 12 and the carrying frame 11, so that the unfolded child carrying mechanism 10 can have better structural stability. When each of the supporting components 13 is detached from the carrying frame 11, each of the supporting components 13 can be pivotally folded relative to the surrounding frame 12, so that the child carrying mechanism 10 can be folded compactly.

However, the present application is not limited to this embodiment. For example, in another embodiment, the child carrying mechanism can only include one supporting component located at one end.

As shown in FIG. 3 to FIG. 7, the child carrying mechanism 10 further includes two first locking components 14 movably disposed on the surrounding frame 12 and for locking the surrounding frame 12 in the unfolded state as shown in FIG. 3. The two first locking components 14 are respectively located at a left side and a right side of the child carrying mechanism 10 and movably linked to the supporting component 13 located at the rear end, i.e., the rear supporting component 13. When the rear supporting component 13 is pivoted relative to the surrounding frame 12, the rear supporting component 13 can drive the two first locking components 14 to unlock the surrounding frame 12 for allowing the surrounding frame 12 to switch from the unfolded state as shown in FIG. 3 to the folded state as shown in FIG. 4. Therefore, the child carrying mechanism 10 has convenient and smooth folding operation. Furthermore, since the two first locking components 14 can lock the surrounding frame 12 in the unfolded state for preventing an unintentional folding movement of the unfolded surrounding frame 12, the child carrying mechanism 10 has improved using safety.

However, the present application is not limited to this embodiment. For example, in another embodiment, the left first locking component and the right locking component can be respectively movably linked to the front supporting component and the rear supporting component, i.e., the two locking components can be respectively driven by the two supporting components to unlock the surrounding frame. Alternatively, in another embodiment, the child carrying mechanism can only include one supporting frame at one end and one first locking component at one side and movably linked to the supporting frame.

As shown in FIG. 3 to FIG. 7, the surrounding frame 12 includes two joint devices 121, a handle 122, a first frame component 123 and a second frame component 124. The two joint devices 121 are located at the left side and the right side of the child carrying mechanism 10. Left ends and right ends of the handle 122, the first frame component 123 and the second frame component 124 are respectively disposed on the two joint devices 121. The handle 122, the first frame component 123 and the second frame component 124 are pivotable relative to one another by the two joint devices 121. The two joint devices 121 lock the handle 122 for restraining a pivotal movement of the handle 122 when the surrounding frame 12 is in the unfolded state as shown in FIG. 3. When the first frame component 123 is pivotally folded relative to the second frame component 124, the first frame component 123 drives the two joint devices 121 to unlock the handle 122 for allowing the handle 122 to pivotally fold together with the first frame component 123 relative to the second frame component 124. Therefore, the child carrying mechanism 10 has not only simple structure but also convenient and smooth folding operation. Besides, since the two joint devices 121 can lock the handle 122 for preventing an unintentional folding movement of the handle 122, so as to allow a user to hold the handle 122 for carrying the child carrying mechanism 10 stably when the surrounding frame 12 is in the unfolded state as shown in FIG. 3, the child carrying mechanism 10 has improved using safety.

However, the present application is not limited to this embodiment. For example, in another embodiment, as the child carrying mechanism includes one supporting component at one end and one first locking component at one side movably linked to the supporting component, the surrounding frame can include one joint device at one side for locking the handle.

Figure 8:
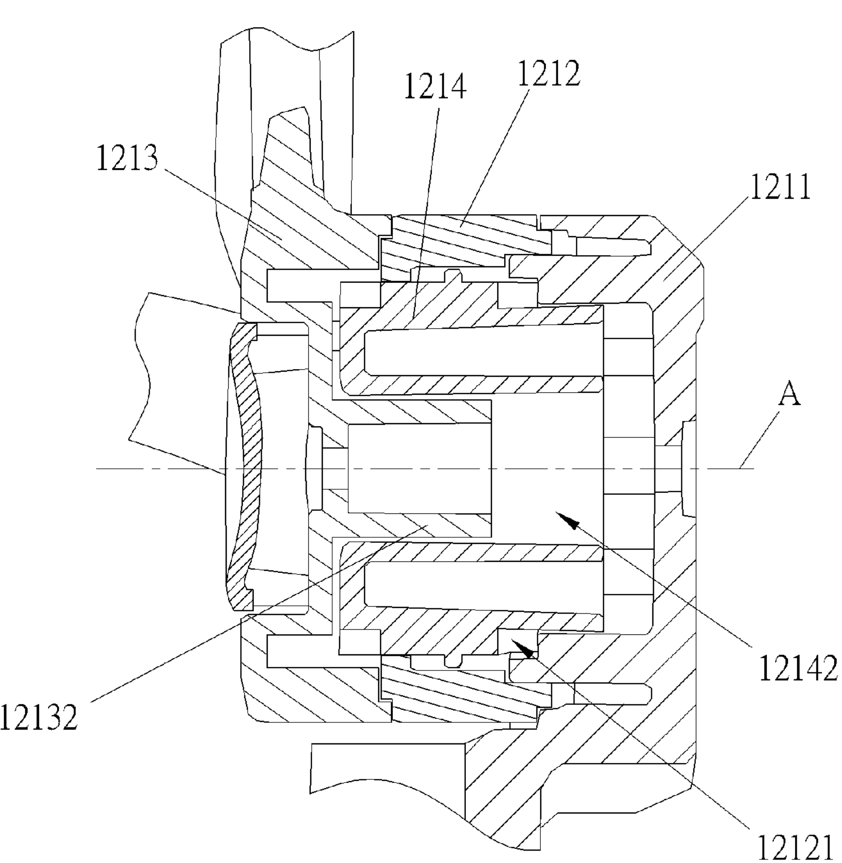
FIG. 8 and FIG. 9 are partial sectional diagrams of the child carrying mechanism in different states according to the embodiment of the present application.
Figure 9:
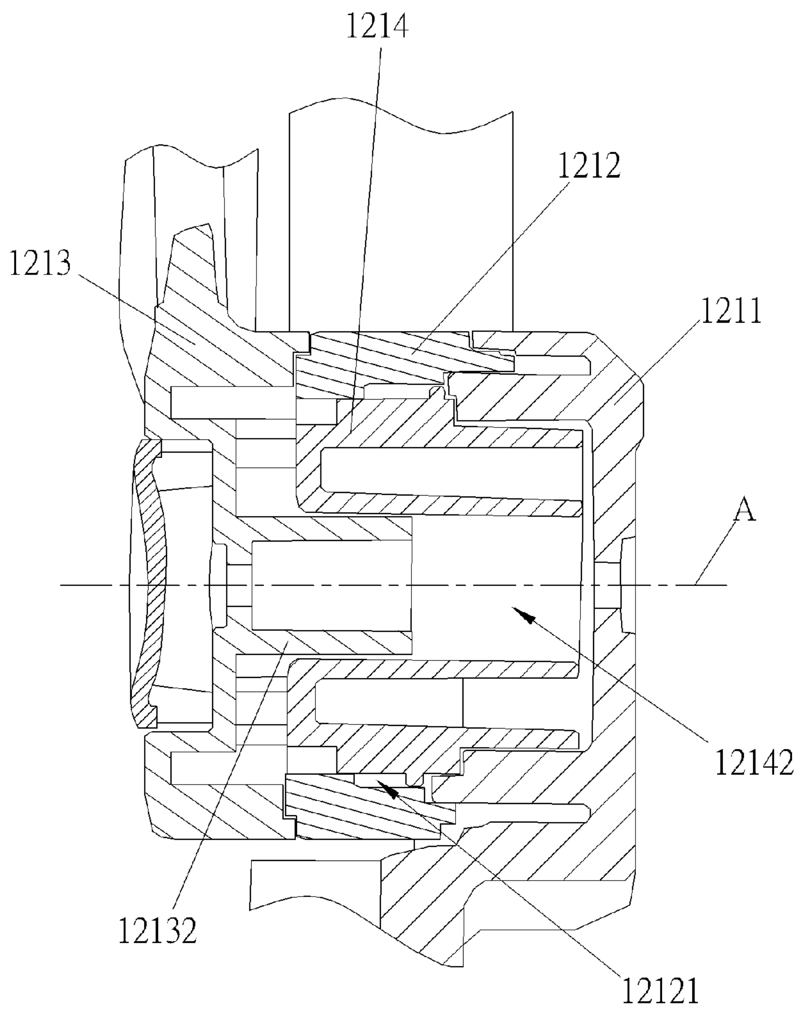

Please refer to FIG. 3 to FIG. 9. FIG. 8 and FIG. 9 are partial sectional diagrams of the child carrying mechanism 10 in different states according to the embodiment of the present application. As shown in FIG. 3 to FIG. 9, each of the joint devices 121 includes a first joint component 1211, a second joint component 1212, a third joint component 1213 and a second locking component 1214. The handle 122 is connected to the third joint component 1213. The second frame component 124 is connected to the first joint component 1211. The first frame component 123 is connected to the second joint component 1212. The first joint component 1211, the second joint component 1212 and the third joint component 1213 are configured to be pivotable relative to one another to allow the handle 122, the first frame component 123 and the second frame component 124 to be pivotable relative to one another, for switching the surrounding frame 12 between the unfolded state as shown in FIG. 3 and the folded state as shown in FIG. 4. The second locking component 1214 is movably disposed on the first joint component 1211. A second locked portion 12131 is formed on the third joint component 1213 and for cooperating with the second locking component 1214. The second locking component 1214 is switchable between a second locking position as shown in FIG. 8 and a second unlocking position as shown in FIG. 9. The second locking component 1214 engages with the second locked portion 12131 when the second locking component 1214 is located at the second locking position as shown in FIG. 8. The second locking component 1214 disengages from the second locked portion 12131 when the second locking component 1214 is located at the second unlocking position as shown in FIG. 9. The second locking component 1214 is movably linked to the second joint component 1212. When the second joint component 1212 pivotally folds relative to the first joint component 1211, the second joint component 1212 drives the second locking component 1214 to move from the second locking position as shown in FIG. 8 to the second unlocking position as shown in FIG. 9 for allowing the third joint component 1213 to pivotally fold together with the second joint component 1212 relative to the first joint component 1211. Since the handle 122, the first frame component 123 and the second frame component 124 are respectively connected to the third joint component 1213, the second joint component 1212 and the first joint component 1211, the pivotally folding first frame component 123 can drive the second joint component 1212 to pivotally drive the second locking component 1214 to unlock the third joint component 1213 for allowing the third joint component 1213 to pivotally fold together with the second joint component 1212 relative to the first joint component 1211, so as to allow the handle 122 to pivotally fold together with the first frame component 123 relative to the second frame component 124. Therefore, the child carrying mechanism 10 has not only simple structure but also convenient and smooth folding operation.

However, the present application is not limited to this embodiment. For example, in another embodiment, the second locked portion can be formed on the first joint component, and the second locking component can be movably disposed on the third joint component and for engaging with the second locked portion to lock the third joint component and/or the handle.

Besides, specifically, the second locked portion 12131 can be an internal gear, and the second locking component 1214 can be a gear shaft for engaging with or disengaging from the internal gear. However, the present application is not limited thereto. It depends on practical demands. For example, in another embodiment, the second locked portion can be a polygonal recess, and the second locking component can be a polygonal column.

As shown in FIG. 5 to FIG. 9, the first joint component 1211 and the third joint component 1213 can be pivotally installed on two opposite sides of the second joint component 1212. The first joint component 1211, the second joint component 1212 and the third joint component 1213 can be pivoted around a first pivoting axis A. Therefore, the child carrying mechanism 10 has not only simple structure but also convenient and smooth folding operation.

Specifically, in order to make structure of the child carrying mechanism 10 more compact, the second locking component 1214 can be disposed on the first joint component 1211 in a slidable manner along an extending direction of the first pivoting axis A and pass through the second joint component 1212. More specifically, a chamber 12121 can be formed on the second joint component 1212 and arranged along the extending direction of the first pivoting axis A, and the chamber 12121 is for allowing the second locking component 1214 to pass therethrough.

Figure 10:
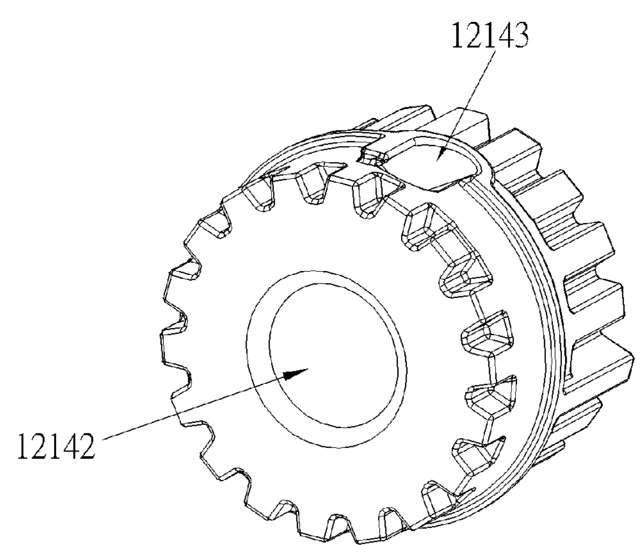
FIG. 10 and FIG. 11 are diagrams of a second locking component at different views according to the embodiment of the present application.
Figure 11:
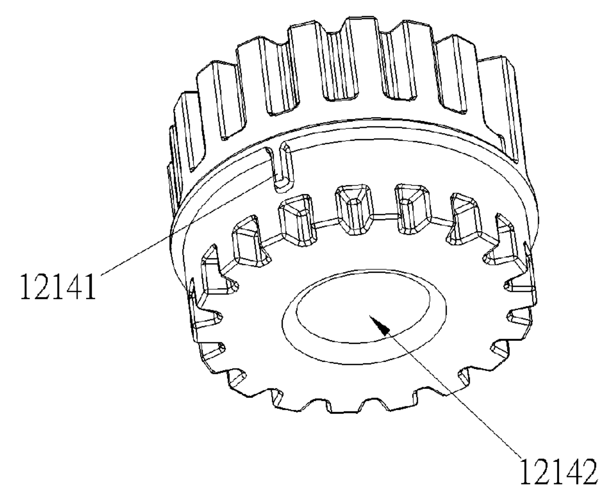
Figure 12:
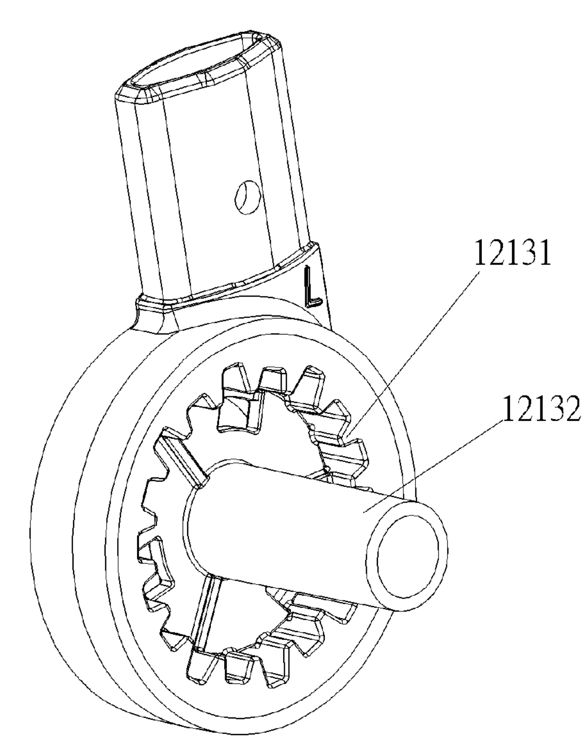
FIG. 12 is a diagram of a third joint component according to the embodiment of the present application.
Figure 13:
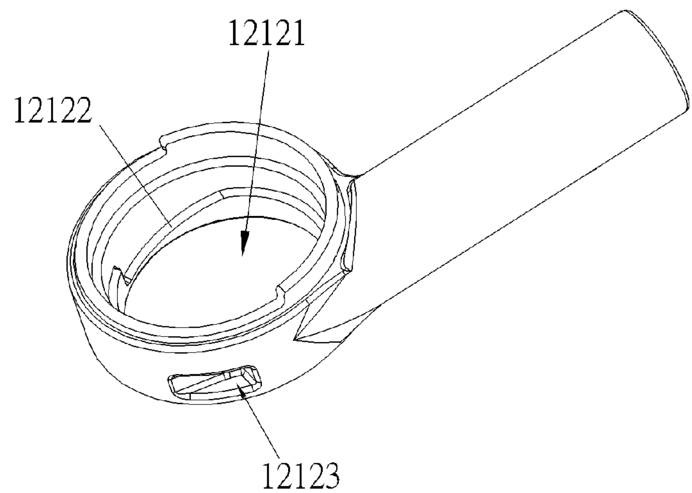
FIG. 13 is a diagram of a second joint component according to the embodiment of the present application.

Please refer to FIG. 5 to FIG. 13. FIG. 10 and FIG. 11 are diagrams of the second locking component 1214 at different views according to the embodiment of the present application. FIG. 12 is a diagram of the third joint component 1213 according to the embodiment of the present application. FIG. 13 is a diagram of the second joint component 1212 according to the embodiment of the present application. As shown in FIG. 5 to FIG. 13, an abutting structure 12122 is formed on the second joint component 1212. An abutted structure 12141 is formed on the second locking component 1214 and for cooperating with the abutting structure 12122. The second joint component 1212 drives the second locking component 1214 to move from the second locking position as shown in FIG. 8 to the second unlocking position as shown in FIG. 9 by a cooperation of the abutting structure 12122 and the abutted structure 12141 when the second joint component 1212 pivotally folds relative to the first joint component 1211.

However, the present application is not limited to this embodiment. For example, in another embodiment, there can be two abutting structures formed on the second locking component and two abutted structures formed on the second joint component.

In addition, specifically, in order to make structure of the child carrying mechanism 10 more compact, the abutting structure 12122 can be disposed in the chamber 12121 and can be an inclined structure extending helically relative to the first pivoting axis A, and the abutted structure 12141 can be a protruding structure, e.g., a protruding rib, protruding outwardly from an outer periphery of the second locking component 1214. However, the present application is not limited thereto. It depends on practical demands. For example, in another embodiment, the abutting structure and the abutted structure can be respectively an inclined slot structure and a protruding block.

Besides, as shown in FIG. 5 to FIG. 13, a guiding portion 12132 is formed on the third joint component 1213 and arranged along the extending direction of the first pivoting axis A. A guided portion 12142 is formed on the second locking component 1214 and for slidably cooperating with the guiding portion 12132. The guiding portion 12132 is sleeved in the guided portion 12142, so that the second locking component 1214 can be driven to slide stably by a cooperation of the guiding portion 12132 and the guided portion 12142.

However, the present application is not limited to this embodiment. For example, in another embodiment, the guiding portion can be formed on the first joint component. Alternatively, in another embodiment, the guiding portion can be formed on each of the first joint component and the third joint component.

Furthermore, specifically, the guiding portion 12132 can be a pipe-shaped element arranged along the extending direction of the first pivoting axis A, and the guided portion 12142 can be a through hole structure. However, the present application is not limited thereto. It depends on practical demands. For example, in another embodiment, the guiding portion and the guided portion can be a through hole structure and a pipe-shaped element, respectively.

Moreover, in order to drive the second locking component 1214 to recover automatically, each of the joint devices 121 further includes a recovering component 1215 disposed between the first joint component 1211 and the second locking component 1214 for driving the second locking component 1214 to slide to the second locking position as shown in FIG. 8.

However, the present application is not limited to this embodiment. For example, in another embodiment, the recovering component can be omitted.

Besides, specifically, the recovering component 1215 can be a compression spring. However, the present application is not limited thereto. It depends on practical demands. For example, in another embodiment, the recovering component can be a leaf spring.

Figure 17:
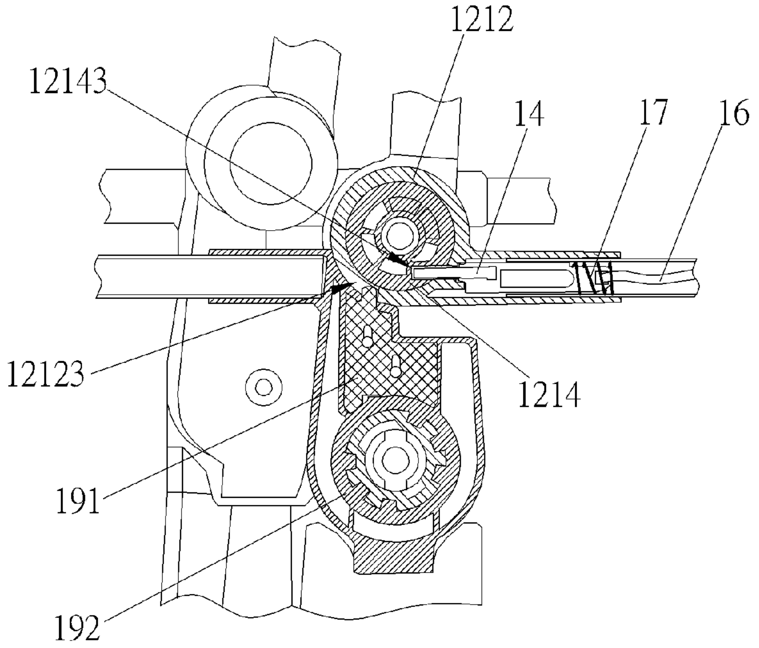
FIG. 17 is a partial sectional diagram of the child carrying mechanism as a first locking component engages with a first locked portion according to the embodiment of the present application.

Please refer to FIG. 5 to FIG. 7, FIG. 10, FIG. 11 and FIG. 17. FIG. 17 is a partial sectional diagram of the child carrying mechanism 10 as the first locking component 14 engages with a first locked portion 12143 according to the embodiment of the present application. As shown in FIG. 5 to FIG. 7, FIG. 10, FIG. 11 and FIG. 17, the first locked portion 12143 is formed on each of the second locking components 1214 and for cooperating with the corresponding first locking component 14. Each of the first locking components 14 is movably linked to the rear supporting component 13. Each of the first locking components 14 is switchable relative to the surrounding frame 12 between a first locking position as shown in FIG. 17 and a first unlocking position. Each of the first locking components 14 engages with the corresponding first locked portion 12143 when each of the first locking components 14 is located at the first locking position as shown in FIG. 17 relative to the surrounding frame 12. Each of the first locking components 14 disengages from the corresponding first locked portion 12143 when each of the first locking components 14 is located at the first unlocking position relative to the surrounding frame 12. When the rear supporting component 13 is pivotally folded relative to the surrounding frame 12, the rear supporting component 13 drives the two first locking components 14 to move from the first locking positions as shown in FIG. 17 to the first unlocking positions. Therefore, the child carrying mechanism 10 has convenient and smooth folding operation. When the surrounding frame 12 is in the unfolded state, the two first locking components 14 can respectively engage with the two first locked portions 12143 for restraining the two second locking components 1214 to restrain the two second joint components 1212, so as to restrain the first frame component 123 from pivotally folding relative to the second frame component 124, which achieves a purpose of locking the surrounding frame 12 in the unfolded state by the two first locking components 14.

However, the present application is not limited to this embodiment. For example, in another embodiment, the first locked portion can be formed on the first joint component or the third joint component, so as to lock the first joint component or the third joint component for locking the surrounding frame in the unfolded state.

Furthermore, specifically, the first locked portion 12143 can be an insertion slot structure, and the first locking component 14 can be an insertion pin. However, the present application is not limited thereto. It depends on practical demands.

As shown in FIG. 3 to FIG. 7 and FIG. 17, the upper ends of the two supporting components 13 are pivotally disposed on the surrounding frame 12. The two first locking components 14 are slidably disposed on the surrounding frame 12 and movably linked to the rear supporting component 13. When the rear supporting component 13 is pivoted relative to the surrounding frame 12, the rear supporting component 13 can quickly drive each of the first locking components 14 to engage with or disengage from the corresponding second locking component 1214 for locking or unlocking the surrounding frame 12.

Preferably, the two first locking components 14 can be slidably disposed on a left side and a right side of the first frame component 123, and the upper ends of the supporting components 13 can be respectively pivotally disposed on the first frame component 123 and the second frame component 124.

Figure 18:
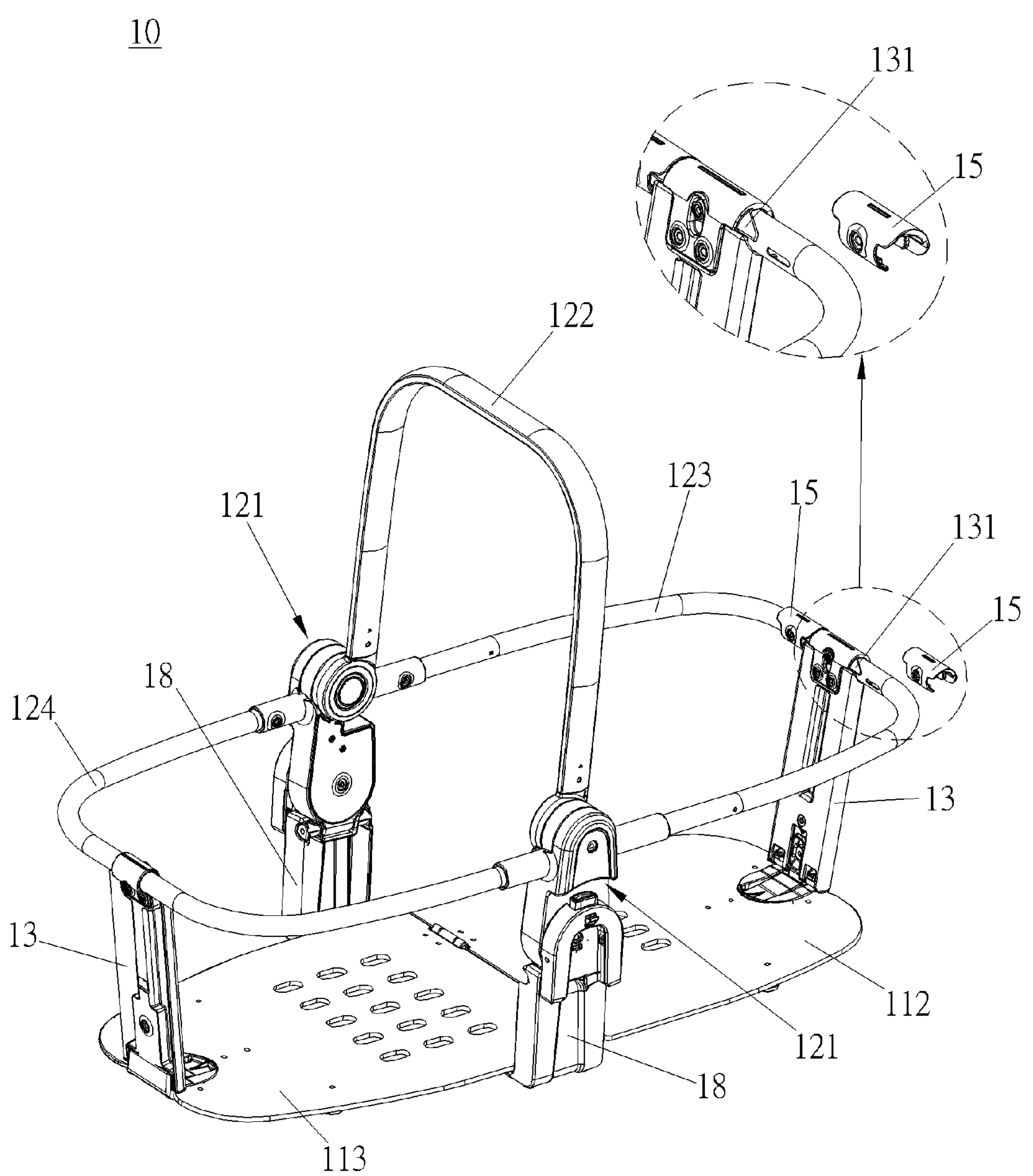
FIG. 18 is a diagram of the child carrying mechanism as a sliding component is detached according to the embodiment of the present application.
Figure 19:
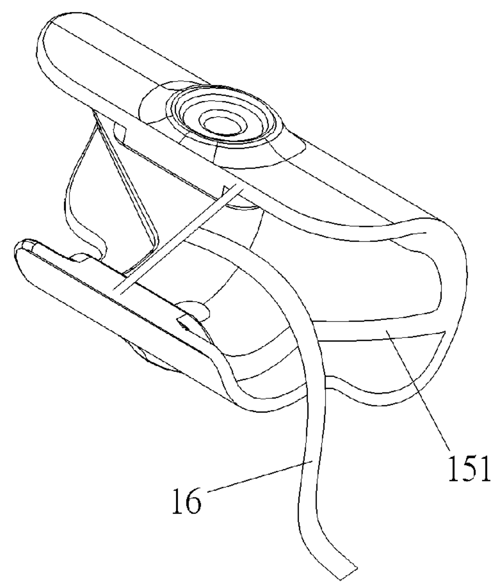
FIG. 19 is a diagram of the sliding component according to the embodiment of the present application.

Please refer to FIG. 3 to FIG. 7 and FIG. 17 to FIG. 19. FIG. 18 is a diagram of the child carrying mechanism 10 as a sliding component 15 is detached according to the embodiment of the present application. FIG. 19 is a diagram of the sliding component 15 according to the embodiment of the present application. As shown in FIG. 3 to FIG. 7 and FIG. 17 to FIG. 19, the child carrying mechanism 10 further includes two sliding components 15. Each of the two sliding components 15 is slidably disposed on the first frame component 123 and movably linked to the upper end of the rear supporting component 13 and the corresponding first locking component 14. When the rear supporting component 13 is pivotally folded relative to the surrounding frame 12, the rear supporting component 13 drives the two sliding components 15 to slide to respectively drive the two first locking components 14 to move from the first locking positions to the first unlocking positions. Since the pivoting rear supporting component 13 can drive the two sliding components 15 to slide to quickly switch the two first locking components 14 to the first unlocking positions by sliding movements of the two sliding components 15, the child carrying mechanism 10 has convenient and smooth folding operation.

However, the present application is not limited to this embodiment. For example, in another embodiment, the child carrying mechanism can include one sliding component. Alternatively, in another embodiment, the sliding component can be slidably disposed on the second frame component as it is desired to configure the first locking component and the front supporting component to be movably linked to each other.

Besides, in order to movably link each of the sliding components 15 to the corresponding first locking component 14, the child carrying mechanism 10 further includes two linking components 16. Each of the linking components 16 is disposed between the corresponding sliding component 15 and the corresponding first locking component 14. A first end and a second end of each of the linking components 16 are respectively connected to the corresponding sliding component 15 and the corresponding first locking component 14.

However, the present application is not limited to this embodiment. For example, in another embodiment, the child carrying mechanism can only include one first locking component, one sliding component and one linking component connected between the first locking component and the sliding component.

Specifically, the linking component 16 can be a metal wire. However, the present application is not limited thereto. It depends on practical demands. For example, in another embodiment, the linking component can be a strap or a strip.

Besides, in this embodiment, in order to make structure of the child carrying mechanism 10 more compact and more aesthetic, the two first locking components 14 and the two linking components 16 can be disposed in the first frame component 123 for hiding the two first locking components 14 and the two linking components 16.

However, the present application is not limited to this embodiment. For example, in another embodiment, as the child carrying mechanism includes one first locking component and one linking component, one and another one of the first locking component and the linking component can be respectively disposed inside and outside the first frame component.

Furthermore, in order to drive the first locking components 14 to recover automatically, the child carrying mechanism 10 further includes two resilient components 17. Each of the resilient components 17 is disposed between the corresponding first locking component 14 and the first frame component 123 for driving the corresponding first locking component 14 to the first locking position.

Specifically, the resilient component 17 can be a compression spring for easy installation. However, the present application is not limited thereto. It depends on practical demands. For example, in another embodiment, the resilient component can be a leaf spring.

Figure 14:
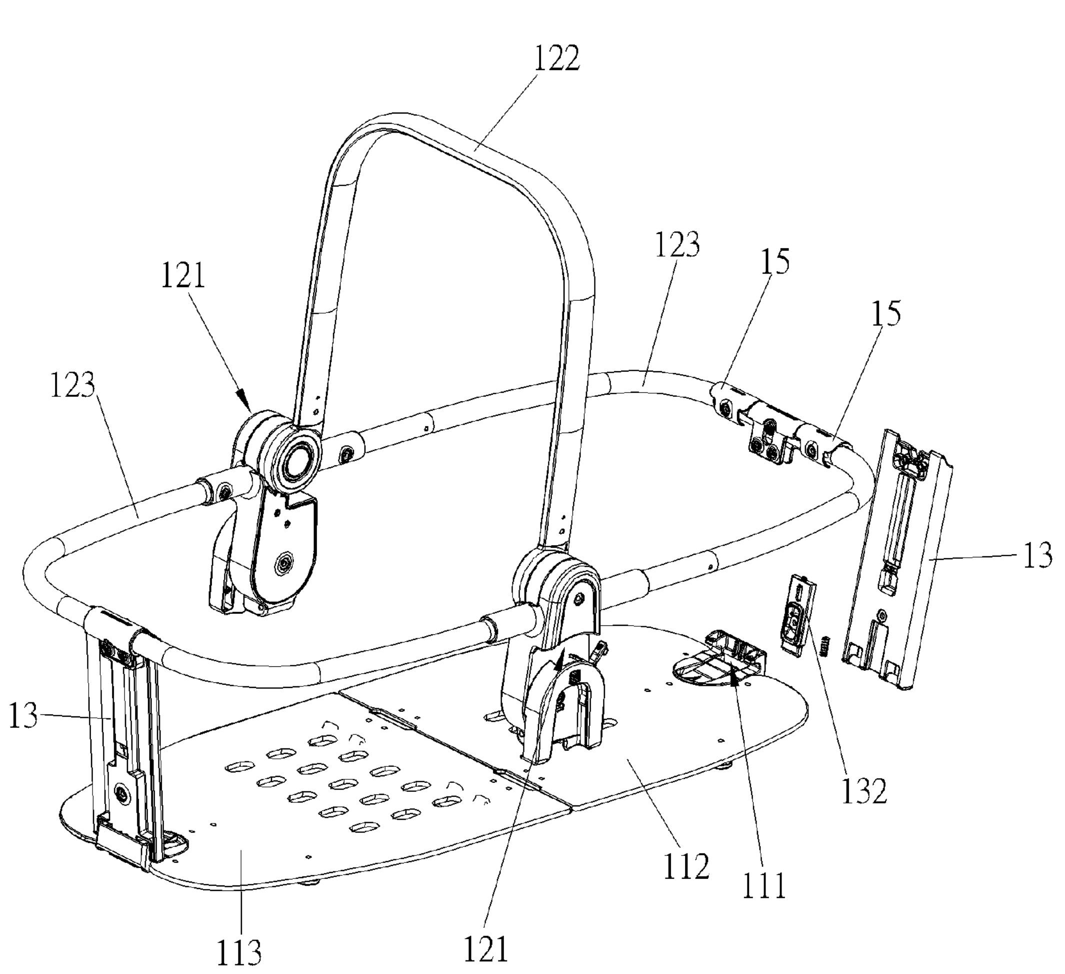
FIG. 14 is a partial exploded diagram of the child carrying mechanism according to the embodiment of the present application.
Figure 15:
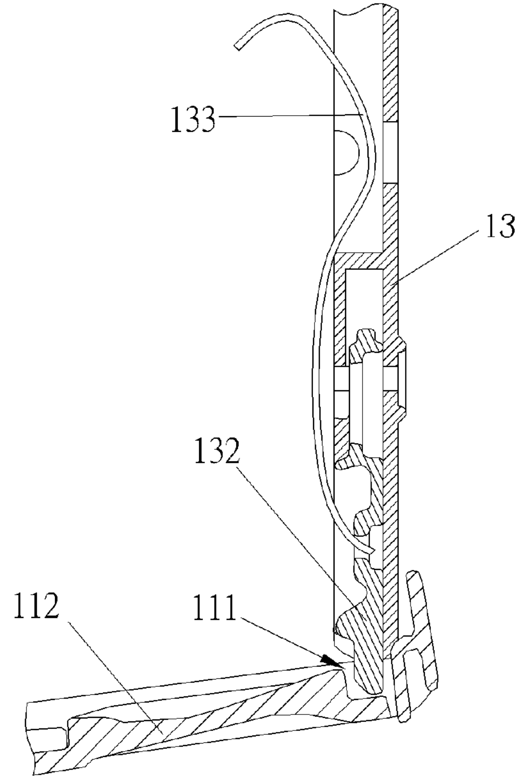
FIG. 15 is a partial sectional diagram of the child carrying mechanism as a supporting component is installed on a carrying frame according to the embodiment of the present application.
Figure 16:
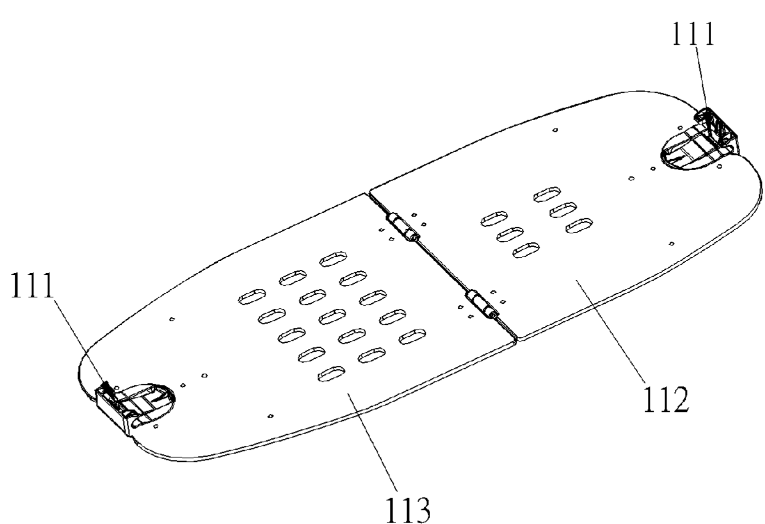
FIG. 16 is a diagram of the carrying frame according to the embodiment of the present application.

Please refer to FIG. 14 to FIG. 19. FIG. 14 is a partial exploded diagram of the child carrying mechanism 10 according to the embodiment of the present application. FIG. 15 is a partial sectional diagram of the child carrying mechanism 10 as the supporting component 13 is installed on the carrying frame 11 according to the embodiment of the present application. FIG. 16 is a diagram of the carrying frame 11 according to the embodiment of the present application. As shown in FIG. 14 to FIG. 19, a driven portion 151 is formed on each of the sliding components 15 and inclined relative to a sliding direction of each of the sliding components 15. Two driving portions 131 are formed on the upper end of the rear supporting component 13 and for respectively cooperating with the driven portions 151 of the two sliding components 15. When the rear supporting component 13 is pivotally folded relative to the surrounding frame 12, the rear supporting component 13 can drive the two sliding components 15 to move toward or away from the upper end of the rear supporting component 13 by a cooperation of the driving portions 131 and the driven portions 151, so as to allow the rear supporting component 13 to drive the sliding components 15 smoothly.

However, the present application is not limited to this embodiment. For example, in another embodiment, there can be one driving portion formed on the upper end of the supporting component as the child carrying mechanism includes only one sliding component.

Specifically, the driving portion 131 and the driven portion 151 can be inclined surfaces for easy installation. However, the present application is not limited thereto. For example, in another embodiment, the driving portion and the driven portion can be an inclined guiding slot structure and a guiding block.

As shown in FIG. 14 to FIG. 16, the child carrying mechanism 10 further includes two mounting components 132 and two mounted portions 111. Each of the mounting components 132 is slidably disposed on the lower end of the corresponding supporting component 13. The two mounted portions 111 are disposed on the carrying frame 11. Each of the supporting components 13 can be installed on the carrying frame 11 by a cooperation of the corresponding mounting component 132 and the corresponding mounted portion 111 and can be detached from the carrying frame 11 by detachment of the corresponding mounting component 132 and the corresponding mounted portion 111, so as to make assembly and disassembly of the supporting components 13 and the carrying frame 11 easier and more convenient.

However, the present application is not limited to this embodiment. For example, in another embodiment, the mounting component can be slidably installed on the carrying frame, and the mounted portion can be disposed on the lower end of the supporting component.

Specifically, the mounting component 132 can be a block-shaped element, and the mounted portion 111 can be an engaging hole structure. However, the present application is not limited thereto. It depends on practical demands.

In order to make operation of the mounting components 132 more convenient, the child carrying mechanism 10 further includes two operating components 133 respectively disposed on the two mounting components 132.

However, the present application is not limited to this embodiment. For example, in another embodiment, the child carrying mechanism can only include one mounting component, one mounted portion and one operating component.

Specifically, the operating component 133 can be a soft component, e.g., a wire, a strap or a strip. However, the present application is not limited thereto. It depends on practical demands.

In addition, the child carrying mechanism 10 further includes two connecting bases 18. The carrying frame 11 includes a first carrying component 112 and a second carrying component 113 installed on the first carrying component 112. The first carrying component 112 and the second carrying component 113 are pivotable relative to each other. The surrounding frame 12 is installed on a left side and a right side of the second carrying component 113 by the two connecting bases 18. The two mounted portions 111 are respectively disposed on an end portion of the first carrying component 112 and an end portion of the second carrying component 113 opposite to each other, so as to enable the child carrying mechanism 10 to provide reliable support for the child.

However, the present application is not limited to this embodiment. For example, in another embodiment, the child carrying mechanism can only include one connecting base, and the surrounding frame can be installed on the first carrying component by the connecting base.

Besides, in order to allow the child carrying mechanism 10 to be folded compactly, each of the connecting base 18 can be configured to be pivotally foldable relative to the first joint component 1211.

Figure 20:
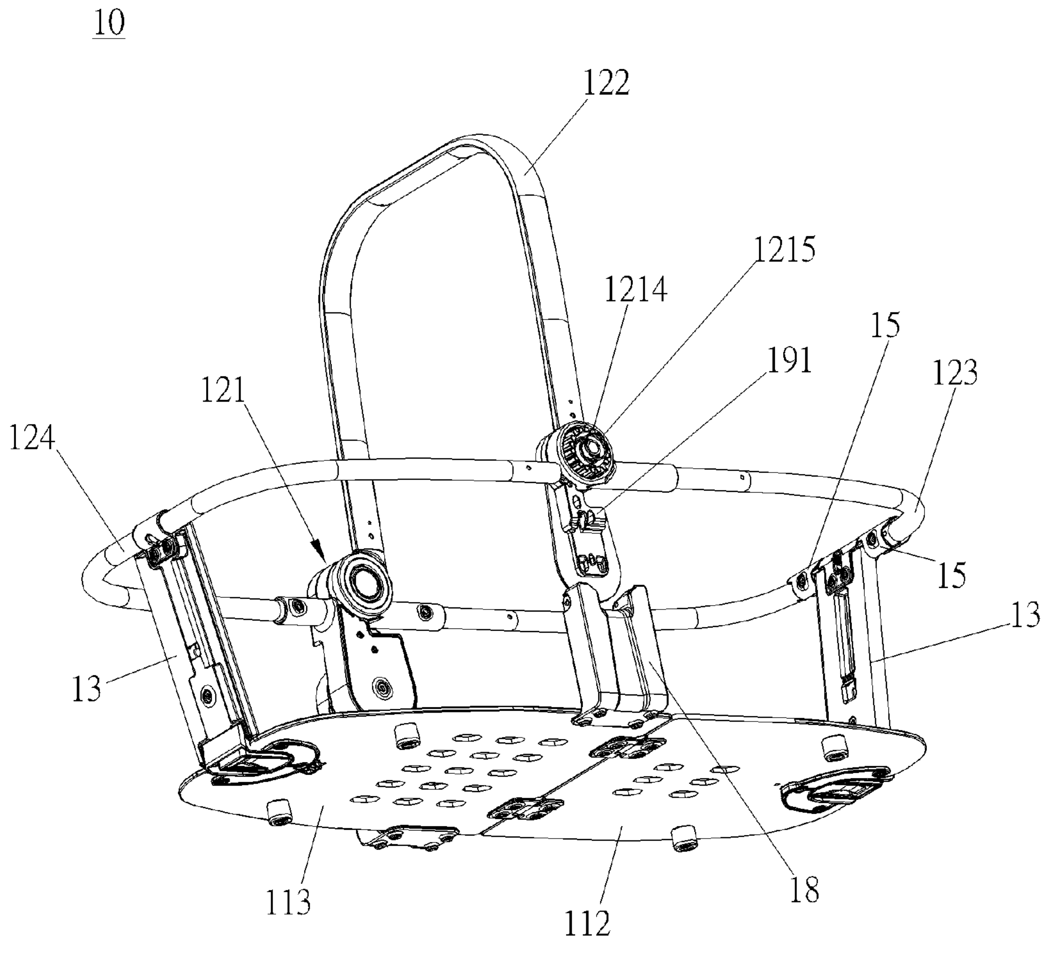
FIG. 20 is a partial diagram of the child carrying mechanism according to the embodiment of the present in application.
Figure 21:
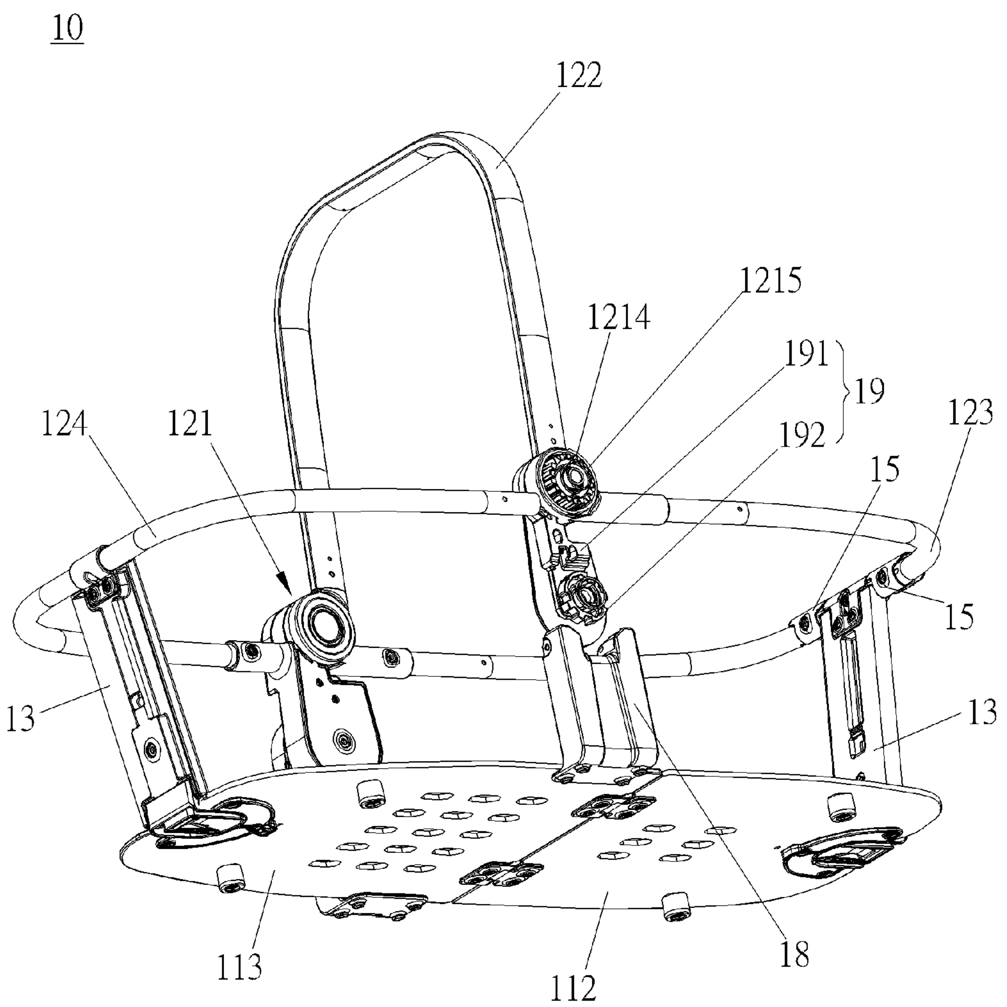
FIG. 21 is another partial diagram of the child carrying mechanism according to the embodiment of the present application.
Figure 22:
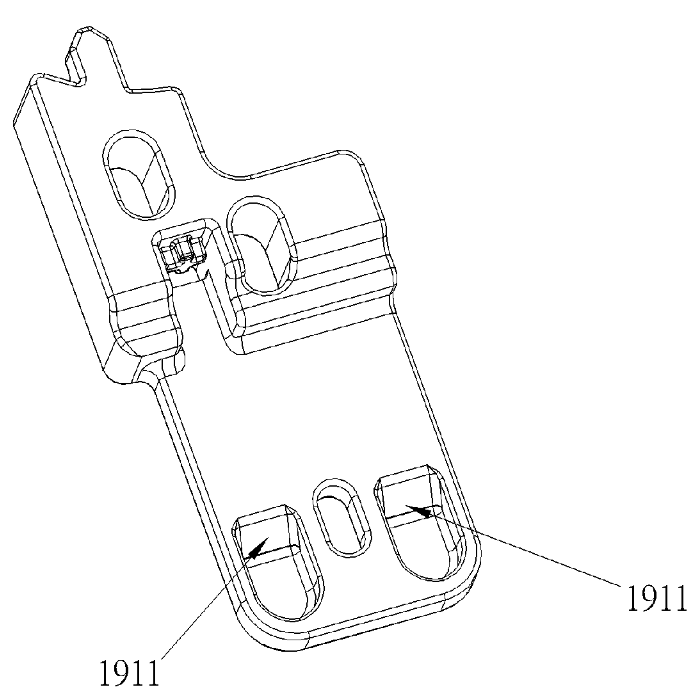
FIG. 22 is a diagram of a pushing component according to the embodiment of the present application.
Figure 23:
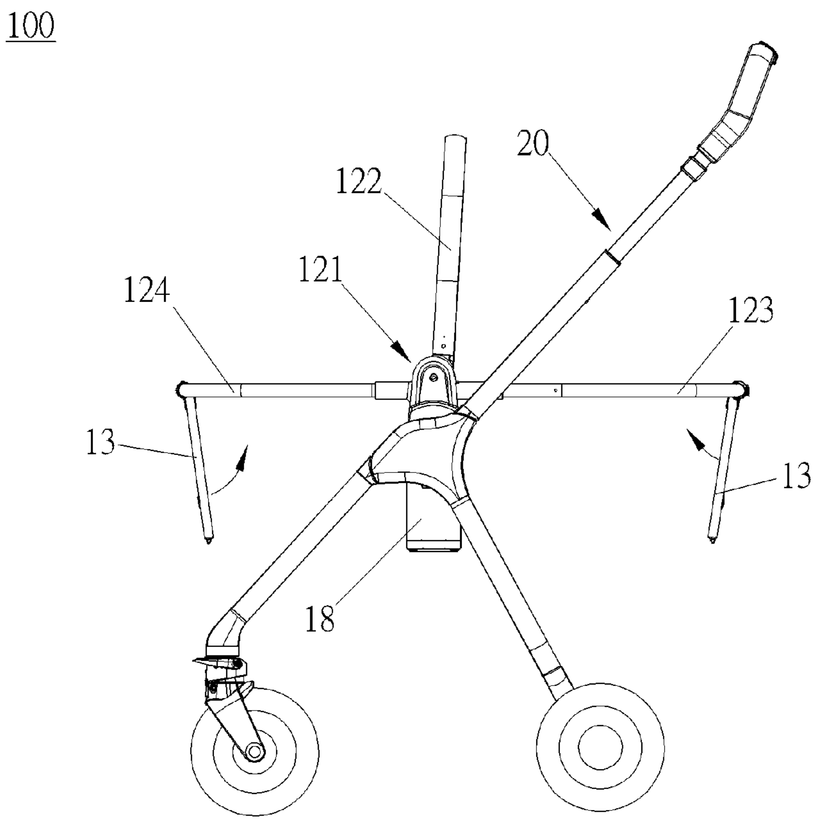
FIG. 23 to FIG. 26 are partial diagrams of the child carrier in different states according to the embodiment of the present application.
Figure 24:
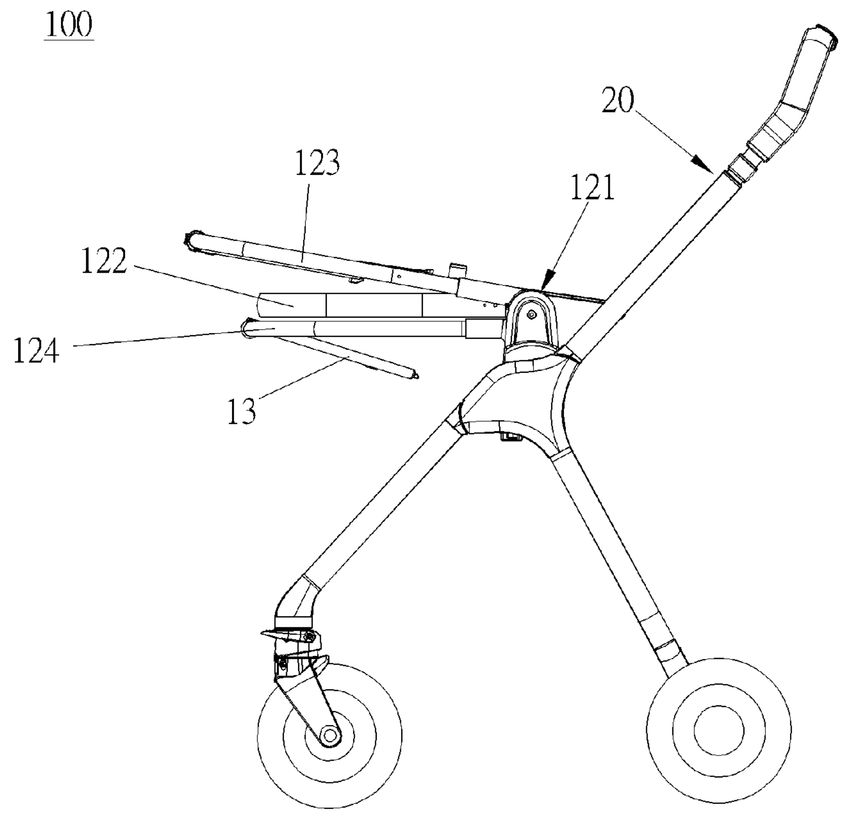
Figure 25:
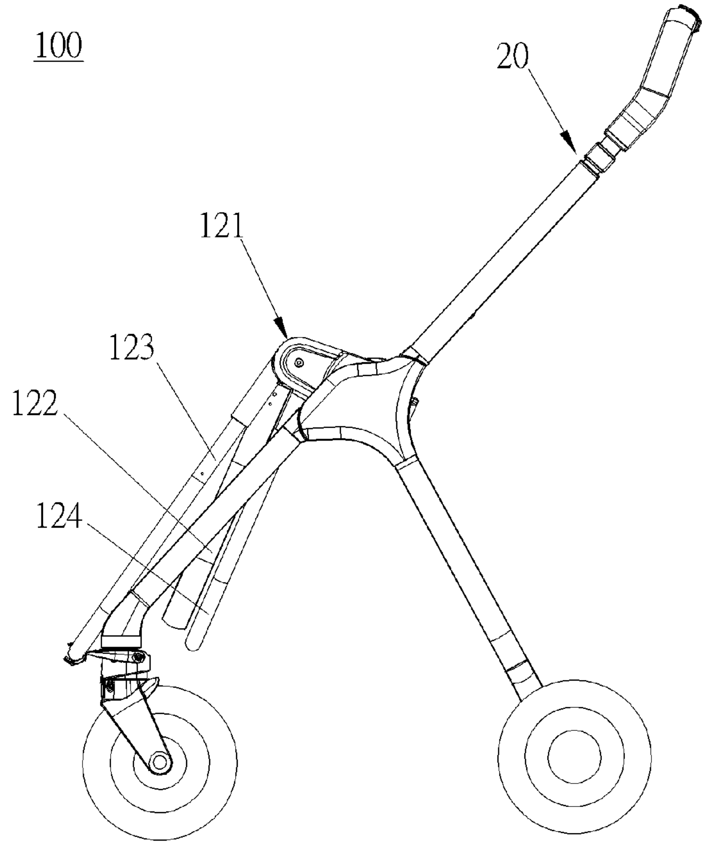
Figure 26:
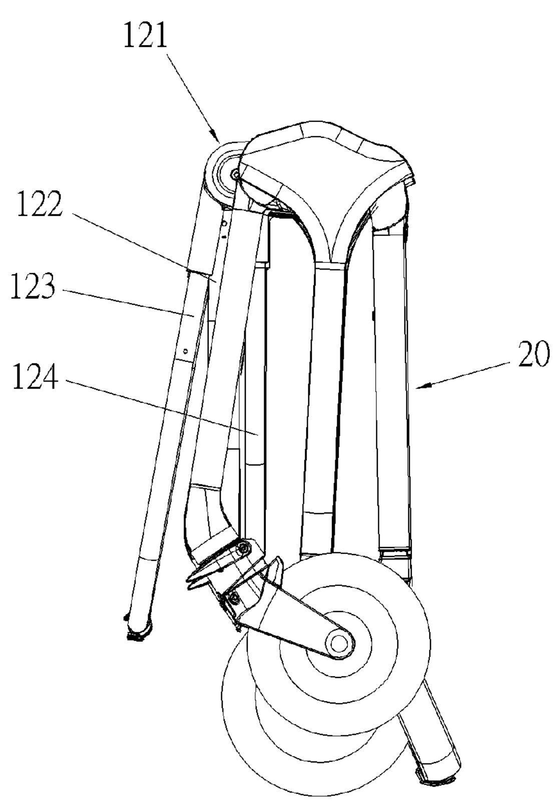

Please refer to FIG. 1, FIG. 2, FIG. 6, FIG. 7 and FIG. 20 to FIG. 26. FIG. 20 is a partial diagram of the child carrying mechanism 10 according to the embodiment of the present application. FIG. 21 is another partial diagram of the child carrying mechanism 10 according to the embodiment of the present application. FIG. 22 is a diagram of a pushing component 191 according to the embodiment of the present application. FIG. 23 to FIG. 26 are partial diagrams of the child carrier 100 in different states according to the embodiment of the present in application. As shown in FIG. 1, FIG. 2, FIG. 6, FIG. 7 and FIG. 20 to FIG. 26, the carrier body 20 is switchable between a used state as shown in FIG. 23 and FIG. 24 and a stored state as shown in FIG. 26. The child carrier 100 further includes two actuators 21 disposed on the carrier body 20 and for unlocking the carrier body 20. When the surrounding frame 12 is switched from the unfolded state as shown in FIG. 23 to the folded state as shown in FIG. 24, the surrounding frame 12 can drive the two actuators 21 to unlock the carrier body 20 for allowing the carrier body 20 to switch from the used state as shown in FIG. 24 to the stored state as shown in FIG. 26. Since the surrounding frame 12 can be folded to drive the two actuators 21 to unlock the carrier body 20 for allowing the carrier body 20 to be folded together with the child carrying mechanism 10, the present application has convenient and smooth folding operation.

However, the present application is not limited to this embodiment. For example, in another embodiment, the child carrier can only include one actuator.

Specifically, the child carrier 100 further includes two linking devices 19. An end of each of the linking devices 19 is movably linked to the surrounding frame 12. When the surrounding frame 12 switches from the unfolded state as shown in FIG. 23 to the folded state as shown in FIG. 24, the surrounding frame 12 can drive the two linking devices 19 to respectively drive the two actuators 21 to unlock the carrier body 20 for allowing the carrier body 20 to switch from the used state as shown in FIG. 24 to the stored state as shown in FIG. 26.

However, the present application is not limited to this embodiment. For example, in another embodiment, as the child carrier only includes only actuator, the child carrier can only include one linking device.

Preferably, each of the linking devices 19 can be disposed on the corresponding first joint component 1211 for easy installation and allowing each of the linking devices 19 to drive the corresponding actuator 21 more smoothly.

More specifically, each of the linking devices 19 includes the pushing component 191 and a pushed component 192. Each of the pushing components 191 is slidable relative to the corresponding first joint component 1211 along a vertical direction upwardly or downwardly. Each of the pushed components 192 is slidable relative to the corresponding first joint component 1211 along a horizontal direction inwardly or outwardly. An upper end of each of the pushing components 191 is movably linked to the corresponding second joint component 1212. A first end of each of the pushed components 192 is movably linked to a lower end of the corresponding pushing component 191. A second end of each of the pushed components 192 is disposed on the corresponding first joint component 1211 in a retractable and extendable manner. When the surrounding frame 12 switches from the unfolded state to the folded state, the surrounding frame 12 can push the two pushing components 191 to slide downwardly. When the two pushing components 191 slide downwardly, the two pushing components 191 can respectively push the two pushed components 192 to slide outwardly to drive the two actuators 21 to unlock the carrier body 20.

Preferably, in order to allow each of the second joint components 1212 to drive the corresponding pushing component 191 smoothly, a pushing hole structure 12123 is formed on each of the second joint components 1212. A lower surface of each of the pushing hole structure 12123 is an inclined surface. An upper end of each of the pushed components 192 is inserted into the corresponding pushing hole structure 12123. Furthermore, in order to allow each of the pushing components 191 to drive the corresponding pushed component 192 smoothly, a pushing structure 1911 is formed on a lower end of each of the pushing components 191 and for cooperating with the corresponding pushed component 192. When each of the pushing components 191 slides downwardly, each of the pushing components 191 pushes the corresponding pushed component 192 to slide outwardly by the corresponding pushing structure 1911.

In this embodiment, the pushing structure 1911 can be a slanted structure for transforming a vertical movement of the pushing component 191 to a horizontal movement of the pushed component 192.

As shown in FIG. 1 to FIG. 26, operational principle of the present application is provided as follows. When it is desired to fold the child carrier 100, the user can pull the two operating components 133 to respectively drive the two mounting components 132 to slide upwardly to disengage from the two mounted portions 111 and then pivotally fold the first carrying component 112 relative to the second carrying component 111. Afterwards, the user can pivotally fold the two supporting components 13 relative to the surrounding frame 12 along arrow directions as shown in FIG. 23. When the rear supporting component 13 is pivotally folded relative to the surrounding frame 12, the rear supporting component 13 can drive the two sliding components 15 to slide toward the upper end of the rear supporting component 13 by the cooperation of the driving portions 131 and the driven portions 151, so as to drive the two first locking components 14 to move from the first locking positions to the first unlocking positions by the two linking components 16 for disengaging the first locking components 14 from the two first locked portions 12143 to unlock the surrounding frame 12. When the surrounding frame 12 is unlocked, the user can pivotally fold the first frame component 123 relative to the second frame component 124. When the first frame component 123 is pivotally folded relative to the second frame component 124, the two second joint components 1212 can be driven by the first frame component 123 to pivotally fold relative to the two first joint components 1211, so as to drive the two first locking components 14 to move from the second locking positions to the second unlocking positions by the cooperation of the abutting structures 12122 and the abutted structures 12141 for disengaging the second locking components 1214 from the two second locked portions 12131 to allow the handle 122 to pivotally fold together with the first frame component 123 relative to the second frame component 124. Besides, when the two second joint components 1212 are driven by the first frame component 123 to pivotally fold relative to the two first joint components 1211, the two second joint components 1212 can push the two pushing components 191 to slide downwardly by the pushing hole structures 12123. When the two pushing components 191 slide downwardly, the two pushing components 191 drive the two pushed components 192 to slide outwardly for driving the two actuators 21 to unlock the carrier body 20, so as to allow the user to pivotally fold the carrier body 20 together with the child carrying mechanism 10 for folding the child carrier 100 to a state as shown in FIG. 26.

In contrast to the prior art, in the present application, the child carrying mechanism includes the carrying frame, the surrounding frame and the supporting component. The surrounding frame is disposed above the carrying frame and located at a position corresponding to the carrying frame. The surrounding frame is switchable between an unfolded state and a folded state. The supporting component is connected between the surrounding frame and the carrying frame. The child carrying mechanism can be unfolded or folded by switching the surrounding frame to the unfolded state or the folded state. Therefore, the present application has advantages of simple structure and the easy folding operation, which is convenient for daily use, maintenance and carrying.

Those skilled in the art will readily observe that numerous modifications and alterations of the device and method may be made while retaining the teachings of the application. Accordingly, the above disclosure should be construed as limited only by the metes and bounds of the appended claims.

What is claimed is:

1. A child carrying mechanism comprising:

a carrying frame;

a surrounding frame disposed above the carrying frame and located at a position corresponding to the carrying frame, the surrounding frame being switchable between an unfolded state and a folded state;

a supporting component connected between the surrounding frame and the carrying frame, a lower end of the supporting component is detachably installed on the carrying frame, and an upper end of the supporting component is pivotable relative to the surrounding frame; and a first locking component, the first locking component being movably disposed on the surrounding frame and for locking the surrounding frame in the unfolded state, the supporting component driving the first locking component to unlock the surrounding frame for allowing the surrounding frame to switch from the unfolded state to the folded state when the supporting component is pivoted relative to the surrounding frame.

2. The child carrying mechanism of claim 1, wherein a first locked portion is formed on the surrounding frame and for cooperating with the first locking component, the supporting component and the first locking component are movably linked with each other, the first locking component is switchable relative to the surrounding frame between a first locking position and a first unlocking position, the first locking component engages with the first locked portion when the first locking component is located at the first locking position, the first locking component disengages from the first locked portion when the first locking component is located at the first unlocking position, and the supporting component drives the first locking component to move from the first locking position to the first unlocking position when the supporting component is pivotally folded relative to the surrounding frame.

3. The child carrying mechanism of claim 2, wherein the first locking component is slidably disposed on the surrounding frame.

4. The child carrying mechanism of claim 2, wherein the upper end of the supporting component is pivotally disposed on the surrounding frame.

5. The child carrying mechanism of claim 2, further comprising a sliding component slidably disposed on the surrounding frame and movably linked to the upper end of the supporting component and the first locking component, and the supporting component driving the sliding component to drive the first locking component to move from the first locking position to the first unlocking position when the supporting component is pivotally folded relative to the surrounding frame.

6. The child carrying mechanism of claim 5, further comprising a linking component disposed between the sliding component and the first locking component, and a first end and a second end of the linking component being connected to the sliding component and the first locking component respectively.

7. The child carrying mechanism of claim 6, wherein at least one of the first locking component and the linking component is disposed in the surrounding frame.

8. The child carrying mechanism of claim 5, wherein a driven portion is formed on the sliding component and inclined relative to a sliding direction of the sliding component, a driving portion is formed on the upper end of the supporting component and for cooperating with the driven portion, and the supporting component pivots relative to the surrounding frame to drive the sliding component to slide toward or away from the upper end of the supporting component by a cooperation of the driving portion and the driven portion.

9. The child carrying mechanism of claim 2, further comprising:

a mounting component slidably disposed on one of the lower end of the supporting component and the carrying frame; and a mounted portion disposed on another one of the lower end of the supporting component and the carrying frame, the supporting component being installed on the carrying frame by a cooperation of the mounting component and the mounted portion.

10. The child carrying mechanism of claim 9, further comprising an operating component disposed on the mounting component.

11. The child carrying mechanism of claim 9, further comprising a connecting base, the carrying frame comprising a first carrying component and a second carrying component installed on the first carrying component, the first carrying component and the second carrying component being pivotable relative to each other, the surrounding frame being installed on the first carrying component or the second carrying component by the connecting base, one of the mounted portion and the mounting component being disposed on an end portion of the first carrying component, and another one of the mounted portion and the mounting component being disposed on the lower end of the supporting component.

12. The child carrying mechanism of claim 1, wherein the surrounding frame comprises a joint device, a handle, a first frame component and a second frame component, the handle, the first frame component and the second frame component are disposed on the joint device and pivotable relative to one another by the joint device, the joint device locks the handle when the surrounding frame is in the unfolded state, and the first frame component drives the joint device to unlock the handle for allowing the handle to pivotally fold together with the first frame component relative to the second frame component when the first frame component is pivotally folded relative to the second frame component.

13. A child carrying mechanism comprising:

a carrying frame;

a surrounding frame disposed above the carrying frame and located at a position corresponding to the carrying frame, the surrounding frame being switchable between an unfolded state and a folded state, wherein the surrounding frame comprises a joint device, a handle, a first frame component and a second frame component, the handle, the first frame component and the second frame component are disposed on the joint device and pivotable relative to one another by the joint device, the joint device locks the handle when the surrounding frame is in the unfolded state, and the first frame component drives the joint device to unlock the handle for allowing the handle to pivotally fold together with the first frame component relative to the second frame component when the first frame component is pivotally folded relative to the second frame component; and a supporting component connected between the surrounding frame and the carrying frame, wherein the joint device comprises a first joint component, a second joint component, a third joint component and a second locking component, the first joint component, the second joint component and the third joint component are pivotable relative to one another, a second locked portion is formed on one of the first joint component and the third joint component and for cooperating with the second locking component, the second locking component is movably disposed on another one of the first joint component and the third joint component, the second locking component is switchable between a second locking position and a second unlocking position, the second locking component engages with the second locked portion when the second locking component is located at the second locking position, the second locking component disengages from the second locked portion when the second locking component is located at the second unlocking position, the second joint component and the second locking component are movably linked to each other, the handle is connected to the third joint component, the second frame component is connected to the first joint component, and the first frame component is connected to the second joint component.

14. The child carrying mechanism of claim 13, wherein the second joint component drives the second locking component to move from the second locking position to the second unlocking position for allowing the third joint component to pivotally fold together with the second joint component relative to the first joint component when the second joint component pivotally folds relative to the first joint component.

15. The child carrying mechanism of claim 13, wherein the first joint component and the third joint component are pivotally installed on a first side and a second side of the second joint component respectively, and the first joint component, the second joint component and the third joint component are pivotable around a first pivoting axis.

16. The child carrying mechanism of claim 15, wherein the second locking component is disposed on the another one of the first joint component and the third joint component in a slidable manner along an extending direction of the first pivoting axis and passes through the second joint component.

17. The child carrying mechanism of claim 16, wherein a chamber is formed on the second joint component and arranged along the extending direction of the first pivoting axis, and the second locking component passes through the chamber.

18. The child carrying mechanism of claim 17, wherein an abutting structure is formed on one of the second joint component and the second locking component, an abutted structure is formed on another one of the second joint component and the second locking component, and the second joint component drives the second locking component to move from the second locking position to the second unlocking position by a cooperation of the abutting structure and the abutted structure when the second joint component pivotally folds relative to the first joint component.

19. The child carrying mechanism of claim 18, wherein the abutting structure is an inclined structure extending helically relative to the first pivoting axis.

20. The child carrying mechanism of claim 18, wherein the abutted structure is a protruding structure protruding outwardly from an outer periphery of the second locking component.

21. The child carrying mechanism of claim 15, wherein a guiding portion is formed on at least one of the first joint component and the second joint component and arranged along an extending direction of the first pivoting axis, a guided portion is formed on the second locking component and for cooperating with the guiding portion, and the guiding portion is sleeved in the guided portion.

22. A child carrier comprising a carrier body, and a child carrying mechanism installed on the carrier body, the child carrying mechanism comprising:

a carrying frame;

a surrounding frame disposed above the carrying frame and located at a position corresponding to the carrying frame, the surrounding frame being switchable between an unfolded state and a folded state; and a supporting component connected between the surrounding frame and the carrying frame, a lower end of the supporting component is detachably installed on the carrying frame, and an upper end of the supporting component is pivotable relative to the surrounding frame; and a first locking component, the first locking component being movably disposed on the surrounding frame and for locking the surrounding frame in the unfolded state, the supporting component driving the first locking component to unlock the surrounding frame for allowing the surrounding frame to switch from the unfolded state to the folded state when the supporting component is pivoted relative to the surrounding frame.

23. The child carrier of claim 22, wherein the carrier body is switchable between a used state and a stored state, the child carrier further comprises an actuator disposed on the carrier body and for unlocking the carrier body, and the surrounding frame drives the actuator to unlock the carrier body for allowing the carrier body to switch from the used state to the stored state when the surrounding frame is switched from the unfolded state to the folded state.

24. The child carrier of claim 23, further comprising a linking device, an end of the linking device being movably linked to the surrounding frame, and the surrounding frame driving the linking device to drive the actuator to unlock the carrier body for allowing the carrier body to switch from the used state to the stored state when the surrounding frame is switched from the unfolded state to the folded state.

25. The child carrier of claim 24, wherein the linking device comprises a pushing component and a pushed component, the pushing component is slidable relative to the surrounding frame along a vertical direction upwardly or downwardly, the pushed component is slidable relative to the surrounding frame along a horizontal direction inwardly or outwardly, a first end of the pushed component is movably linked to a lower end of the pushing component, and a second end of the pushed component is disposed on the surrounding frame in a retractable and extendable manner.

26. The child carrier of claim 25, wherein the surrounding frame pushes the pushing component to slide downwardly when the surrounding frame is switched from the unfolded state to the folded state, and the pushing component pushes the pushed component to slide outwardly to drive the actuator to unlock the carrying frame when the pushing component slides downwardly.

27. The child carrier of claim 26, wherein a pushing structure is formed on the lower end of the pushing component and for cooperating with the pushed component, and the pushing component pushes the pushed component to slide outwardly by the pushing structure when the pushing component slides downwardly.

28. The child carrier of claim 27, wherein the pushing structure is a slanted structure.

* * * * *